US011170395B2

(12) United States Patent
Pavletic et al.

(10) Patent No.: US 11,170,395 B2
(45) Date of Patent: Nov. 9, 2021

(54) DIGITAL BANKING PLATFORM AND ARCHITECTURE

(71) Applicant: STACK FINTECH INC., Toronto (CA)

(72) Inventors: Miro Pavletic, Toronto (CA); Sharaf Ansari, Toronto (CA); Yervant Kulbashian, Toronto (CA); Nicolas Dinh, Toronto (CA); Teddy Ying Wai Yip, Toronto (CA)

(73) Assignee: STACK FINTECH INC., Toronto (CA)

( * ) Notice: Subject to any disclaimer, the term of this patent is extended or adjusted under 35 U.S.C. 154(b) by 185 days.

(21) Appl. No.: 16/465,921

(22) PCT Filed: Dec. 4, 2017

(86) PCT No.: PCT/CA2017/051462
§ 371 (c)(1),
(2) Date: May 31, 2019

(87) PCT Pub. No.: WO2018/098598
PCT Pub. Date: Jun. 7, 2018

(65) Prior Publication Data
US 2019/0295114 A1    Sep. 26, 2019

Related U.S. Application Data

(60) Provisional application No. 62/429,369, filed on Dec. 2, 2016.

(51) Int. Cl.
G06Q 30/02       (2012.01)
G06K 9/62        (2006.01)
(Continued)

(52) U.S. Cl.
CPC ....... *G06Q 30/0211* (2013.01); *G06K 9/6256* (2013.01); *G06K 9/6267* (2013.01);
(Continued)

(58) Field of Classification Search
CPC ............... G06Q 30/0211; G06Q 30/02; G06Q 30/0214; G06Q 40/02; G06Q 50/01;
(Continued)

(56) References Cited

U.S. PATENT DOCUMENTS

2010/0042645 A1* 2/2010 Bakalash .......... G06F 16/24539
                                                707/607
2013/0231974 A1* 9/2013 Harris ................ G06Q 30/0201
                                                705/7.29
2014/0156411 A1* 6/2014 Murgai .............. G06Q 30/0269
                                                705/14.58

OTHER PUBLICATIONS

Frias-Martinez, Enrique; "Survey of Data Mining Approaches to User Modeling for Adaptive Hypermedia", Nov. 2006; https://ieeexplore.ieee.org/document/1715503?source=IQplus (Year: 2006).*
(Continued)

*Primary Examiner* — Sam Refai
*Assistant Examiner* — Kyle G Robinson
(74) *Attorney, Agent, or Firm* — Norton Rose Fulbright Canada LLP

(57) ABSTRACT

A computer implemented device is described that is adapted for improving memory efficiency for conducting machine learning on multi-dimensional vectors stored as specially configured data structures. The device includes network interfaces adapted for receiving data sets and communicating with data harvesting applications, as well as data storage and memory for storing the configured data structures. The multi-dimensional vectors and the system provide a data architecture that processes disparate data sets to programmatically extract features transformed from raw information, the extracted features stored in the form of data values
(Continued)

suitable for conducting data approximations and neural network processing.

24 Claims, 26 Drawing Sheets

(51) Int. Cl.
    *G06N 3/04*           (2006.01)
    *G06N 3/08*           (2006.01)
    *G06Q 40/02*         (2012.01)
    *G06Q 50/00*         (2012.01)

(52) U.S. Cl.
    CPC .............. *G06N 3/04* (2013.01); *G06N 3/0454* (2013.01); *G06N 3/08* (2013.01); *G06Q 30/02* (2013.01); *G06Q 30/0214* (2013.01); *G06Q 40/02* (2013.01); *G06Q 50/01* (2013.01); *G06N 3/0445* (2013.01)

(58) Field of Classification Search
    CPC .......... G06N 3/0454; G06N 3/04; G06N 3/08; G06N 3/0445; G06K 9/6256; G06K 9/6267
    See application file for complete search history.

(56) References Cited

OTHER PUBLICATIONS

Canadian Intellectual Property Office (CIPO), International Search Report and Written Opinion for PCT/CA2017/051462 dated Apr. 10, 2018.

\* cited by examiner

Name: John Smith
Employer: XYZ Inc.
Bank Number: 1234
Transit Number: 123-123
Type of Account: Chequing
Method of Payment: Direct Deposit

FIG. 8

9004
The Purchase and Offer Information is Published
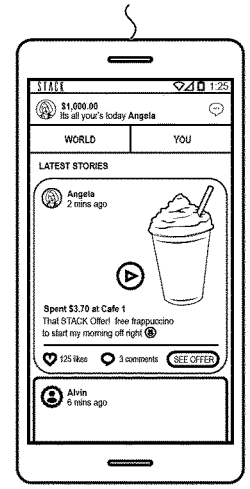
9002
User Activates and Redeems Offer
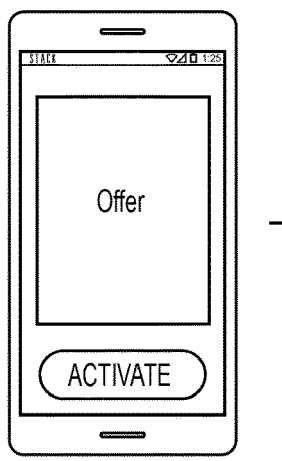
9008
Comment is Extracted on the Server
Whattt?! that's an awesome offer. I'm on my way there right now!
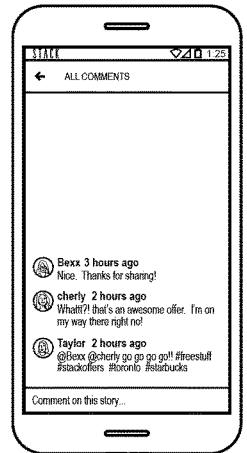
The Transaction is liked and commented on
9006
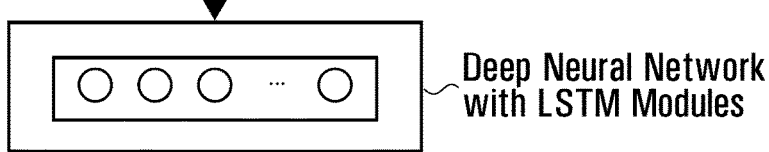
Deep Neural Network with LSTM Modules
Sentiment Score is Obtained (1 is Positive, 0 is Negative) for that User on that Particular Story
0.67
FIG. 9

12,24,6, 4,4, 1,0, 0,0,1

TOTAL (LIKES, COMMENTS, STORIES), AVG (LIKES, COMMENTS),

BINARY (TOP5%TOTAL LIKES, COMMENTS, STORIES)
BINARY(TOP 5% AVERAGE LIKES, COMMENTS)

serviceRequestId=1394921baade42d6a0e543728b6a34c1,
requestorId=Stacklogin,
requestorCredential=5045668E66BD453BD427E345A42F4F91,
serviceName=ONLINE_ALERT_TRANSACTION, channelType=ALT,
channelId=01, microfilRefNumber=71111117166117008542970,
microfilmRefSeq=0, cardNumber=JMrl4TONeQ8dhz0xTrSwJAYmQ+GdJ1FX,
clientId=2924000005, programCode=STK940,
merchantNumber=400422923565, merchantCountryCode=124,
merchantDescription=PIZZA PIZZA #15   TORONTO    CAN,
merchantCity=TORONTO, outletNumber=400422923565,
terminId=92356501, acronym=PIZZA PIZZA # 15   TORONTO    CAN,
mcc=5814, cityName=TORONTO, reversalFlag=N,
transactionDescription=Purchase, transactionSign=D, transactionAmount=3.49,
transactionCurrency=826, billingAmount=3.49, billingCurrency=826,
issMarkupAmount=, authorizationNumber=274518, authorizationCurrency=826,
authorizationAmount=3.49, authorizationMatchFlag=N,
transactionDate=06/15/2017

1102

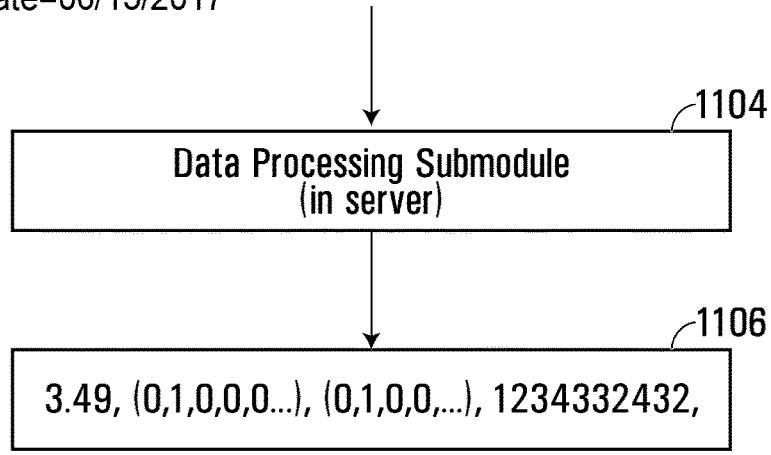

1104
Data Processing Submodule
(in server)

DIGITAL BANKING PLATFORM AND ARCHITECTURE

CROSS REFERENCE

This application claims all benefit, including priority, to U.S. Application No. 62/429,369, entitled "DIGITAL BANKING PLATFORM AND ARCHITECTURE", dated 2 Dec. 2016. U.S. Application No. 62/429,369 is incorporated by reference.

FIELD

The present disclosure generally relates to the field of digital banking, and more particularly to computer implemented systems and methods for efficiently maintaining data structures adapted for provisioning personal financial insights and rewards using at least an extracted set of information derived from transaction information and other tracked information.

INTRODUCTION

Improved approaches to providing and/or provisioning digital banking services is desirable. Tracking user information and behavior is helpful to generate insights in relation to tailoring products and recommendations. There is a finite amount of processing power and memory storage, especially as a solution scales up to maintain information about a large number of users. Further, the information obtained relating to the users can be periodic, sporadic, and patterns are often difficult to discern from the data. The processing of this information is technically challenging, especially as increasingly amounts of information require storage.

SUMMARY

Neural networks are useful in conducting pattern recognition across large disparate multi-dimensional data sets. Information, in the form of received data sets, is obtained over time and utilized to generate further data that is embedded into a system for future use. A technical challenge when providing information for neural networks arises in relation to sizes of inputs, and neural networks are more efficient when there is a fixed size of inputs provided into the neural networks (e.g., less training cycles are required to derive insights). However, using a neural network requiring a fixed size of inputs has downsides in that memory efficiency becomes an important technical factor in the feasibility of a system. Memory requirements can quickly scale up as additional dimensionality is introduced, and if not properly managed, may cause the system to become impractical for its intended purpose.

A computer implemented device is described that is adapted for improving memory efficiency for conducting machine learning on multi-dimensional vectors stored as specially configured data structures. The device includes network interfaces adapted for receiving data sets and communicating with data harvesting applications, as well as data storage and memory for storing the configured data structures.

The multi-dimensional vectors and the system provide a data architecture that processes disparate data sets to programmatically extract features transformed from raw information, the extracted features stored in the form of data values suitable for conducting data approximations and neural network processing.

Each dimension adds an additional data point for analysis, but a challenge with implementing multi-dimensional vectors is a need for significant memory resources to store the multi-dimensional vectors. Further, the speed at which the significant memory resources can be accessed may impact the ability of the system to provide responsive functionality. Where reduced memory resources are required, smaller databases and less expensive memory solutions are possible, and improved data techniques, data architectures and data structures are described herein.

The multi-dimensional vectors are an extracted representation that is configured for use in data processing using neural networks. Efficient data processing using neural networks requires a set of fixed-length (e.g., fixed dimensionality) vectors for approximating user behavior. However, the use of fixed-length vectors leads to inefficient memory usage, especially in the context of tracking user behavior across social media and transactions, where only a small subset of the users have information across many dimensions. Certain neural networks require a fixed input size. Many users will have information across only a small number of dimensions, leading to wasted memory space allocated for storing zero or near-zero values. A technical solution is described to address this technical problem specific to conducting neural network on data structures approximating user behavior.

Memory efficiency is improved by applying enhancements to the data structures to modify memory allocation based on monitored parameters and characteristics, freeing up memory in certain situations in exchange for increased complexity in future access. The multi-dimensional vectors each require a large number of dimensions (e.g., an array with between five hundred and ten-thousand array elements, each array element representing a dimension of the multi-dimensional vectors).

The system includes a computer-implemented device for maintaining, generating, tracking, and/or updating maintaining electronic representations of aggregate user behavior. The aggregate user behavior is represented and stored as a plurality of multi-dimensional vectors, each multi-dimensional vector corresponding to a user of a plurality of users and representing an approximation of the user's behavior as a point in n-dimensional space.

The multi-dimensional vectors are digital representations that are extracted and collated through a corpus of transactions and other interactions (e.g., social media interactions). For example, the multi-dimensional vectors may be a data structure storing a series of numerical or string values that each represent a dimension for analysis (e.g., type of retailer—coffee shop is 15, diner is 18). The numerical or string values are adapted to include similarities with similar values (e.g., coffee shop and diner are closer to one another than coffee shop (15) and gym (42).

If each vector represents a point in n-dimensional space, an aggregate vector can be formed from each user's corpus of transactions, the aggregate vector being updated whenever a transaction or interaction is obtained. The aggregate vector can be utilized for downstream data analysis to, for example, apply distance calculation techniques or other pattern recognition approaches to identify patterns in behavior between users. Groups of users may be plotted as "constellations", wherein similarities across multiple dimensions can be analyzed together, the constellations exhibiting clustering behavior through estimations of their user behavior as indicated by the maintained data structures. The clustering behavior, determined, for example, by way of informational distances, can be utilized to generate computer-based predictions of whether a user would be interested in a particular reward or reward program (e.g., as defined by distance to a vector representing the reward).

The contribution of different dimensions (e.g., correlation, cross-correlation) is processed by a neural network to determine patterns and trained against actual behavior, such that predictions are tuned over time to correct for an error value between predictions and actual behavior. The use of a high number of dimensions (e.g., requiring a large amount of memory) increases the accuracy of the model. Additional dimensions may be established that are derivatives or transformations of underlying dimensions associated with raw data, the additional dimensions storing, for example, may include non-linear transformations or combinations of other dimensions. The additional dimensions aid in neural network processing especially where non-linear relationships are suspected or present, as the number of training cycles required to adapt for non-linear relationships is drastically reduced.

However, including additional dimensions compounds the technical problem associated with memory usage. Due to the constraints of neural network processing requiring fairly fixed-length vectors, each additional dimension adds at least an additional memory requirement across all multi-dimensional vectors (if dense representation techniques are not utilized).

The vectors are obtained by the device including a data receiver configured to receive, from point of sale devices, transaction information data sets representing purchase transactions of each user of the plurality of users, the transaction information including, for each purchase transaction, at least a user identifier, an approximate location of purchase, a time-stamp, a retailer, and a price. The point of sale devices, in some examples, includes cryptocurrency-based solutions, including transactions that are settled on a blockchain and/or distributed ledger technology. Where blockchain or distributed ledger technology is included, a scraping mechanism (e.g., a daemon running on a dedicated server) may periodically or continuously extract transaction information by automatically traversing the ledgers or blockchains.

One or more harvester applications (e.g., mobile applications) residing on user computing devices corresponding to users extract social media data including at least one of text, video, images, and audio data associated with the transaction information. Machine learning or other probabilistic identification approaches are utilized to estimate, from the social media data, types of product associated with each purchase transaction. For each purchase transaction, the device generates a temporary multi-dimensional vector representing each type of product associated with the purchase transaction, the temporary multi-dimensional vector storing, in separate dimensions of the vector, numerical values extracted from at least the transaction information and the social data.

The temporary multi-dimensional vector is used to update an aggregated multi-dimensional vector generated from a corpus of purchase transactions associated for the user by incorporating the temporary multi-dimensional vector into the aggregated multi-dimensional vector. This aggregated multi-dimensional vector represents, over time, a view of the user's purchasing behavior as a point in n-dimensional space. For example, if a user A pursues coupons, typically purchases off-brand generic items, from stores generally located in rural Michigan, such features will be present in the aggregated multi-dimensional vector. As the purchase behavior shifts over time, the point in n-dimensional space established by the aggregated multi-dimensional vector is modified through each update. For example, where the user then switches to online shopping, and develops an outdoorsman-type hobby on retirement, the point in n-dimensional space will begin to reflect these changes.

The aggregated multi-dimensional vector is adapted for processing by a redemption predictor neural network. The redemption predictor neural network is configured for training over a period of time using user multi-dimensional vectors by generating predictions. These are utilized to generate more accurate purchase recommendations as predictions are trained against real-world behavior.

The redemption predictor neural network is an electronic network of "neurons", which process records to establish classifications and identify patterns in data. The redemption predictor neural network may include multiple layers, and neurons may be configured to have different characteristics, such as different speeds of weight modification, memory features (e.g., having past occurrences impact a transfer function), among others. As the dimensionality of the underlying data increases, the neural network tracks a significantly large number of relationships as there may be relationships between each dimension pair (or other types of linkages) and the relationships tracked by neural networks may, for example, exponentially increase, and dimensionality reduction techniques may be required to reduce complexity to a practical level for generating predictions within a reasonable timeframe.

Predictions, for example, may be whether a user, if targeted with an offer or a reward, will redeem the reward. The redemption behavior can be tracked using cookies, direction interaction data sent from the client to the server or other means and provided back to the neural network to update neurons in the form of training.

In an aspect, each multi-dimensional vector is represented in an array (e.g., a single dimensional series of pointers) of a plurality of array elements, and each array element of the plurality of array elements represents a different dimension of the multi-dimensional vector, the array elements, in combination, representing the approximation of the user's behavior in the n-dimensional space. In another aspect, each array element of the plurality of array elements is a pointer to a memory location storing a numerical variable representative of a corresponding characteristic of the user.

In another aspect, the processor is configured to allocate (e.g., determine contiguous memory locations, reserve memory addresses, etc.), for each multi-dimensional vector of the plurality of multi-dimensional vectors, a set of corresponding memory addresses based on the pointer to the memory location of each array element in the array representing the multi-dimensional vector.

In another aspect, the at least one processor is configured to classify (e.g., set a Boolean flag) one or more multi-dimensional vectors of the plurality of multi-dimensional vectors as less-social multi-dimensional vectors based on a determination that the one or more multi-dimensional vectors each contain a number of non-zero array elements below a threshold value. These less-social multi-dimensional vectors may provide an opportunity to identify memory addresses that can be de-allocated. The processor stores the one or more multi-dimensional vectors classified as less-social multi-dimensional vectors as dense representations and de-allocates the sets of memory addresses corresponding to the one or more multi-dimensional vectors classified as less-social multi-dimensional vectors as dense representations.

In another aspect, the dense representations are stored in the form of linked-lists of nodes, each node representing a corresponding non-zero array element, and linked to a next node representing a next non-zero array element unless the node is an end node. The linked-lists of nodes reduce memory space requirements by freeing up space that is otherwise needed for allocation.

In another aspect, the at least one processor is configured to allocate a corresponding memory location for each node to store the corresponding array element and a pointer representing a linkage to a memory address of the memory location of the next node.

In another aspect, the at least one processor is configured to be responsive to a request to provide a selected multi-dimensional vector for processing by the redemption predictor neural network where the selected multi-dimensional vector is presently stored as a dense representation (e.g., in most cases to save memory). In response to the request, the processor allocates a new set of memory addresses to store the array elements of the selected multi-dimensional vector, converts the selected multi-dimensional vector from the dense representation and stores the selected multi-dimensional vector in the new set of allocated memory addresses.

In another aspect, the at least one processor is configured to periodically monitor social activity levels of the one or more multi-dimensional vectors of the plurality of multi-dimensional vectors classified as the less-social multi-dimensional vectors to determine a subset of the less-social multi-dimensional vectors being associated with social activity levels greater than a threshold social activity level (e.g., in accordance with a power-law relationship), re-classify the subset of the less-social multi-dimensional vectors to remove the less-social classification, allocate a new set of memory addresses to store the array elements of the re-classified subset of multi-dimensional vectors; and convert the each multi-dimensional vector of the subset of multi-dimensional vectors from the dense representation and store multi-dimensional vector of the subset of multi-dimensional vectors in the new set of allocated memory addresses. Accordingly, less social but highly active vectors can be re-classified to maintain these vectors in a sparse representation, increasing access speed at a cost of memory efficiency.

In another aspect, the numerical variables stored in each array element include at least both raw data values and transformed data values, the transformed data values determined by applying non-linear transformations (e.g., cubic or log versions) to the raw data values, the transformed data values reducing a number of training cycles otherwise required by the recommender neural network to recognize non-linear patterns correlating redemption behavior and each array element of the plurality of array elements.

In another aspect, a computer-implemented method for maintaining electronic representations of aggregate user behavior stored as a plurality of multi-dimensional vectors, each multi-dimensional vector corresponding to a user of a plurality of users and representing an approximation of the user's behavior in n-dimensional space, method comprising: receiving, from one or more point of sale devices, transaction information data sets representing purchase transactions of each user of the plurality of users, the transaction information including, for each purchase transaction, at least a user identifier, an approximate location of purchase, a timestamp, a retailer, and a price; receiving, from one or more harvester applications residing on user computing devices each corresponding to a user of the plurality of users, social media data including at least one of text, video, images, and audio data associated with the transaction information; estimating, from the social media data, one or more types of product associated with each purchase transaction; generating, for each purchase transaction, a temporary multi-dimensional vector representing the purchase transaction, the temporary multi-dimensional vector storing, in separate dimensions of the vector, numerical values extracted from at least the transaction information and the social data; and updating, for each user associated with the purchase transactions, an aggregated multi-dimensional vector generated from a corpus of purchase transactions associated for the user by incorporating the temporary multi-dimensional vector into the aggregated multi-dimensional vector; wherein the aggregated multi-dimensional vector is adapted for processing by a redemption predictor neural network to identify one or more patterns associated with redemption of one or more electronic offers presented to the plurality of users, the one or more patterns utilized to generate a redemption prediction which is then compared against tracked real-world redemption behavior of the plurality of users to train the redemption predictor neural network.

In another aspect, cohort information transferred from one or more computer servers is displayed on a client device based on one or more dimensions of a selected aggregated multi-dimensional vector representing one or more social interactions including at least one a data set representative of a selection of an interactive visual interface element on a digital representation of a digital story rendering spending data of one or more users in one or more several categories and one or more spending modes.

In another aspect, the one or more spending modes includes at least one or more crypto-currency transactions.

In another aspect, the at least one processor is configured to: classify one or more aggregated multi-dimensional vectors of the plurality of aggregated multi-dimensional vectors as less-social multi-dimensional vectors based on a prioritized ranking of the plurality of aggregated multi-dimensional vectors based at least on a power law distribution used to separately determine at least an in-degree and an out-degree for each aggregated multi-dimensional vector of the plurality of aggregated multi-dimensional vectors.

In another aspect, there is provided a system comprising: one or more computer server configured to that receive and transmit one or more data sets over a network; one or more client devices with a customer application installed on a mobile device that are connected to the server over the network; and a computing node connected to one or more blockchains adapted to offload computational requirements of one or more constant block updates, the computing node coupled to one or more financial institutions through a secure connection for transmission of data sets adapted for at least one of banking accounts, peer to peer payments, and payroll management; wherein the computing node is configured to determine and parse representations of at least one of user behaviour, information and product information, and to generate one or more comparison vectors and offer recommendations based at least on these representations and transfer the one or more comparison vectors or offer recommendations to a client device of the one or more client devices across the communication network.

In another aspect, there is provided a method for generating computer-implemented recommendations for user behaviour using a plurality of neural networks, each neural network including at least two layers, the method utilizing one or more multi-dimensional vectors representative of one or more data sets tracking representations of one or more financial goals, the method comprising: tracking historical activity by users into a series of actions separated by time, the historical activity captured by in the one or more multi-dimensional vectors; processing, through the plurality of neural networks, a subset of the one or more multi-dimensional vectors, the subset of the one or more multi-dimensional vectors representing behavior of a user tracked for a period of time prior to a detected achievement of a financial goal, the plurality of the neural networks generating one or more recommended actions based on changes detected in the subset of the one or more multi-dimensional vectors during the period of time; determining that the one or more recommended actions are applicable to a selected user; and transmitting, to a client device associated with the selected user, one or more data sets representative of the one or more recommended actions.

In another aspect, the at least one processor is configured to: provision a multi-dimensional vector representative of a reward for redemption, the reward including a pre-defined number of available potential referrals by a selected user; receive an indication of a request to share the reward with a second user of the plurality of users; determine one or more vector distances between (i) the aggregated multi-dimensional vector associated with the second user and (ii) at least one of the aggregated multi-dimensional vector associated with the selected user and the multi-dimensional vector representative of the reward for redemption; responsive to the request, provision the reward for redemption to the second user, and decrement the number of available potential referrals by the selected user by a second pre-defined number, the second pre-defined number determined at least based on the one or more vector distances.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 8 is an example set of information associated with a user profile, according to some embodiments.

FIG. 9 is an example method flow illustrative of a method for automated extraction of information from a posted text string (comment) to generate a sentiment score for embedding into a feature vector, according to some embodiments.

FIG. 14 is an example data flow illustrating raw information that is processed to generate a vector data structure, according to some embodiments.

DETAILED DESCRIPTION

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
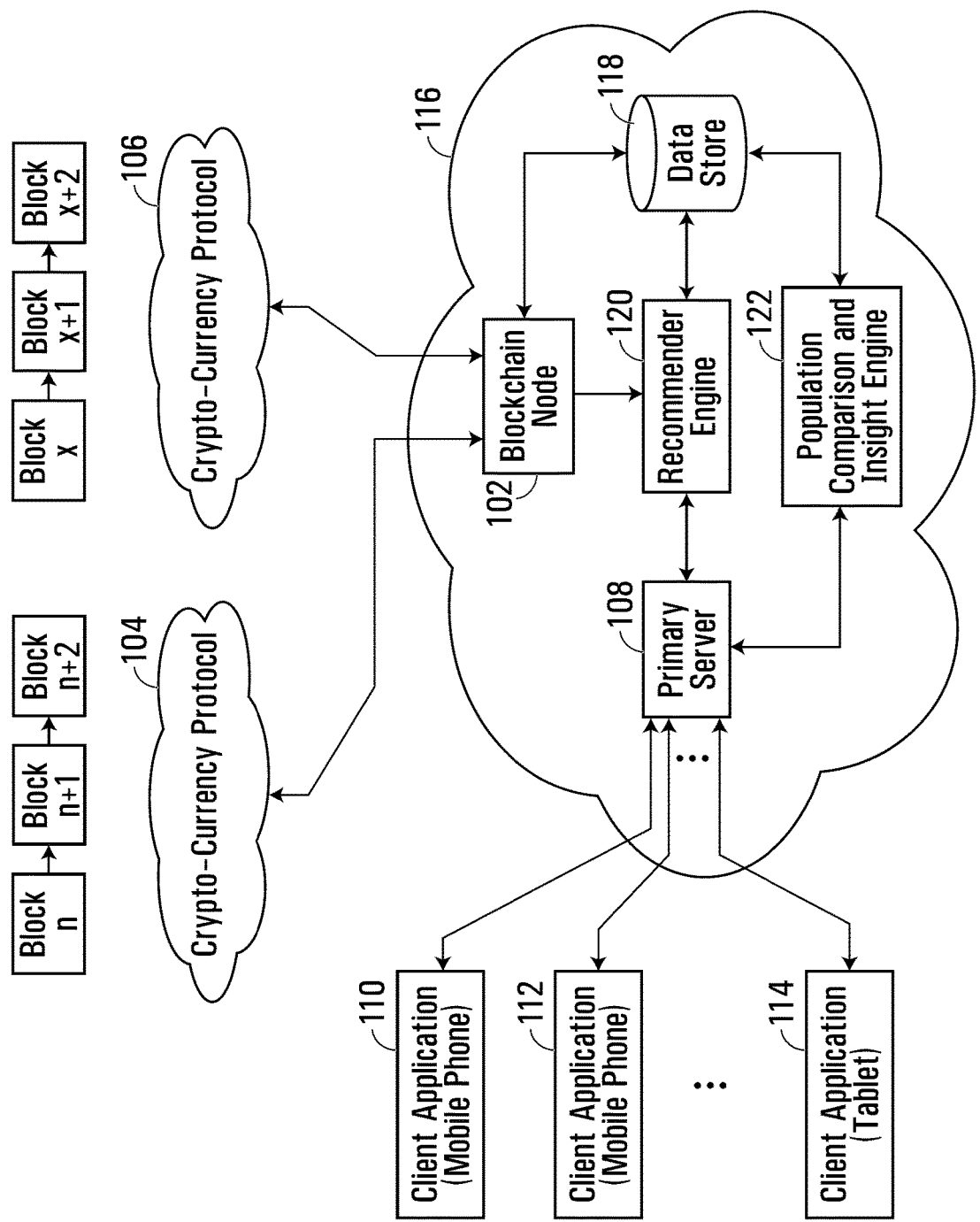
FIG. 1 is a block schematic diagram of computer-implemented device for maintaining, generating, tracking, and/or updating maintaining electronic representations of aggregate user behavior and reward information that operates as a component of a digital banking platform, according to some embodiments.

FIG. 1 is a block schematic diagram of computer-implemented device for maintaining, generating, tracking, and/or updating maintaining electronic representations of aggregate user behavior that operates as a component of a digital financial services platform, according to some embodiments.

As illustrated in FIG. 1, the device includes, for example, a cryptocurrency interface (e.g., through a blockchain node 102 that is configured for interoperation with crypto-currency protocols 104 and 106. A primary server 108 is configured to receive transactional or non-transactional information data sets from one or more client applications 110, 112, and 114. Transactional data sets may include transactional information provided synchronously, asynchronously, in bulk, or concurrent with transactions, and the transactional data sets may include purchase information, including price, retailer, point of sale location, and point of sale device. The data sets are received in the form of raw data or metadata payloads. Non-transactional data sets include other information harvested from the client applications 110, 112, and 114 (e.g., a specially configured mobile application) and include text, call data, social media posts, hashtags, images, audio, and video. The non-transactional data sets may be provided in the form of raw data or metadata payloads.

The primary server 108 includes one or more processors, computer memory, and non-transitory computer readable media and is configured to receive the transactional and non-transactional data sets from various client applications 110, 112, and 114 and point of sale devices, and tracks, for each user, a profile storing at least data records that include a computer-approximation generated representing user behavior, in the form of multi-dimensional vectors. As there is finite available memory and processing power, extracts are taken from the non-transactional data and the transactional data to form of the multi-dimensional vectors. The more dimensions are included in the multi-dimensional vectors, the better the approximation may be, but a technical trade-off is that higher dimensionality leads to more difficult downstream computations and technical challenges relating to access of data and storage requirements thereof.

The platform 116 operates in an environment that combines several financial services such as a banking account, peer to peer payments, payroll management, mobile contactless payments and currency exchange, with social network services such as posts, comments and likes and cryptocurrency purchases. The transactional and non-transactional data is combined used to derive financial insights such as financial advice and offer recommendations as well as presenting user's cohort comparisons.

The system includes a computer-implemented device (the primary server 108) for maintaining, generating, tracking, and/or updating maintaining electronic representations of aggregate user behavior. The aggregate user behavior is represented and stored as a plurality of multi-dimensional vectors, each multi-dimensional vector corresponding to a user of a plurality of users and representing an approximation of the user's behavior as a point in n-dimensional space. The vectors are stored in data store 118. Data store 118 has finite memory storage capabilities and it should be noted that each multi-dimensional vector requires significant storage space for storage (e.g., arrays of 500-10,000 variables, for each user, which can cause significant problems during scale-up to handle concurrent transactions and information from tens of thousands of users).

The multi-dimensional vectors are digital representations that are extracted and collated through a corpus of transactions and other interactions (e.g., social media interactions). For example, the multi-dimensional vectors may be a data structure storing a series of numerical or string values that each represent a dimension for analysis (e.g., type of retailer—coffee shop is 15, diner is 18). The numerical or string values are adapted to include similarities with similar values (e.g., coffee shop and diner are closer to one another than coffee shop (15) and gym (42). Because each multi-dimensional vector comprises a large number of values, the memory usage associated with each vector becomes a significant technical challenge as the number of vectors for storage/processing increases. For example, where each vector stores 10,000 variables, for 100,000 users, there would be $10^9$ variables requiring storage. Further, processing time required for processing 10,000 variables for every processing request (e.g., providing the variables into a neural network) is computationally intensive.

As transactions and non-transactional data is received from client applications 110, 112, and 114, vectors are continually updated to shift an aggregate vector representing the user such that the user's point in n-space drifts towards a holistic understanding of known data points. The speed of drifting, etc., may be determined through a relevancy score (e.g., how recent, whether the purchase is an outlier, how confident the system is in whether the user actually made the transaction on his/her own behalf or whether the user was actually purchasing on behalf of another (e.g., a friend treating another friend).

The primary server 108 is configured for improving memory efficiency for storing and accessing multi-dimensional vectors, which are then utilized for conducting machine learning by accessing the specially configured data structures, for example via recommender engine 120 and population, comparison, and insight engine 122. Recommender engine 120 generates predictions and includes a neural network that receives the multi-dimensional vectors as inputs for comparing against a vector associated with a particular recommendation. The recommender engine 120 is configured to receive the vector and output a prediction (e.g., a Boolean value) indicating whether the recommender engine 120, through activation of its neurons, estimates that the user is likely or not likely to redeem an offer. The recommender engine 120 is configured to receive data sets indicative of success or failure (e.g., a client application 110, 112, or 114 is configured to render and display offers, and track redemptions thereof).

An example technique for generating recommendations is provided below:

---
Algorithm 6 Generating Recommendations
---
print These steps are done on the entire data repository.
for Every User U do
    demographicVector ← extractDemographicData(U)
    goalsAndSpendingVector ← extractGoalAndSpendingFeatures(U)
    cryptoVector ← extractCryptoCurrencyFeatures |U|
    testVector ← extractTestFeatures (U)
    socialVector ← extractSocialFeatures:
    cohortVector ← getCohortFeatures( )
    combinedVector ← combine | demographicVector.
    goalsAndSpendingVector.cryptoVector.testVector.socia
    for Every image [ do
        appendtcombinedVector.getImageFeatures(U)
    end for
    for Every Image V do
        appendcombinedVector.getVideoFeatures(V))
    end for
end for
split the known user-offer interaction combined vectors into training and test sets
trainedModel ← trainFactorisationMachine(trainingSet)
calculateAccuracyOnModel(testSet.trainedModel)
print Wait until request for offer recommendations for a User U on item I
predictedRespons ← predict(trainedModel.U.I)
if predictedResponse threshold(usually 0.5) then
    showRecommendation(U.I)
end if

---

The population, comparison, and insight engine 122 is configured to track clustering of user multi-dimensional vectors and based on the clustering, classify users into different cohorts, which are then utilized for comparisons of the user's saving/spending behavior, and goals. For example, if a user is classified as a female between 20-22 years of age, and receiving 40,000-45,000 USD in income while growing a strong government pension, the spending goals and savings metrics will be tuned to match this cohort so that any recommendations or goals may be more realistic given the user's income and savings. The cohort user feature vector is expanded is include categorical spending (ex: spending on rent, clothes and food as individual features).

Based on the type of offer, the recommender engine may be reconfigured to predict a continuous value (a regression) which represents the number of predicted redemptions of distributing a predicted exclusive offer to a selected user device.

Not all of a user feature vector may be used for generating comparisons (e.g., the user feature vector may be partially utilized). In addition spending data that is aggregated in the a user feature vector can be further broken down in categories such as spending on clothes, rent, transport, and internet etc. This information is compiled from the category code in the transaction information as well as publicly available data on merchants such as merchant category and merchant catalog, among others.

The device includes network interfaces adapted for receiving data sets and communicating with data harvesting applications on client applications 110, 112, or 114, as well as data storage and memory for storing the configured data structures on data store 118.

The multi-dimensional vectors are an extracted representation that is configured for use in data processing using neural networks. Efficient data processing using neural networks requires a set of fixed-length (e.g., fixed dimensionality) vectors for approximating user behavior. However, the use of fixed-length vectors leads to inefficient memory usage, especially in the context of tracking user behavior across social media and transactions, where only a small subset of the users have information across many dimensions. Many users will have information across only a small number of dimensions, leading to wasted memory space allocated for storing zero or near-zero values. A technical solution is described to address this technical problem specific to conducting neural network on data structures approximating user behavior.

Memory efficiency is improved by applying enhancements to the data structures to modify memory allocation based on monitored parameters and characteristics, freeing up memory in certain situations in exchange for increased complexity in future access. The multi-dimensional vectors each require a large number of dimensions (e.g., an array with between five hundred and ten-thousand array elements, each array element representing a dimension of the multi-dimensional vectors). Given the large number of elements, memory efficiency is an important factor in ensuring the system is capable of conducting computer processing using the vectors within a commercially reasonable timeframe given finite computing resources.

Figure 2:
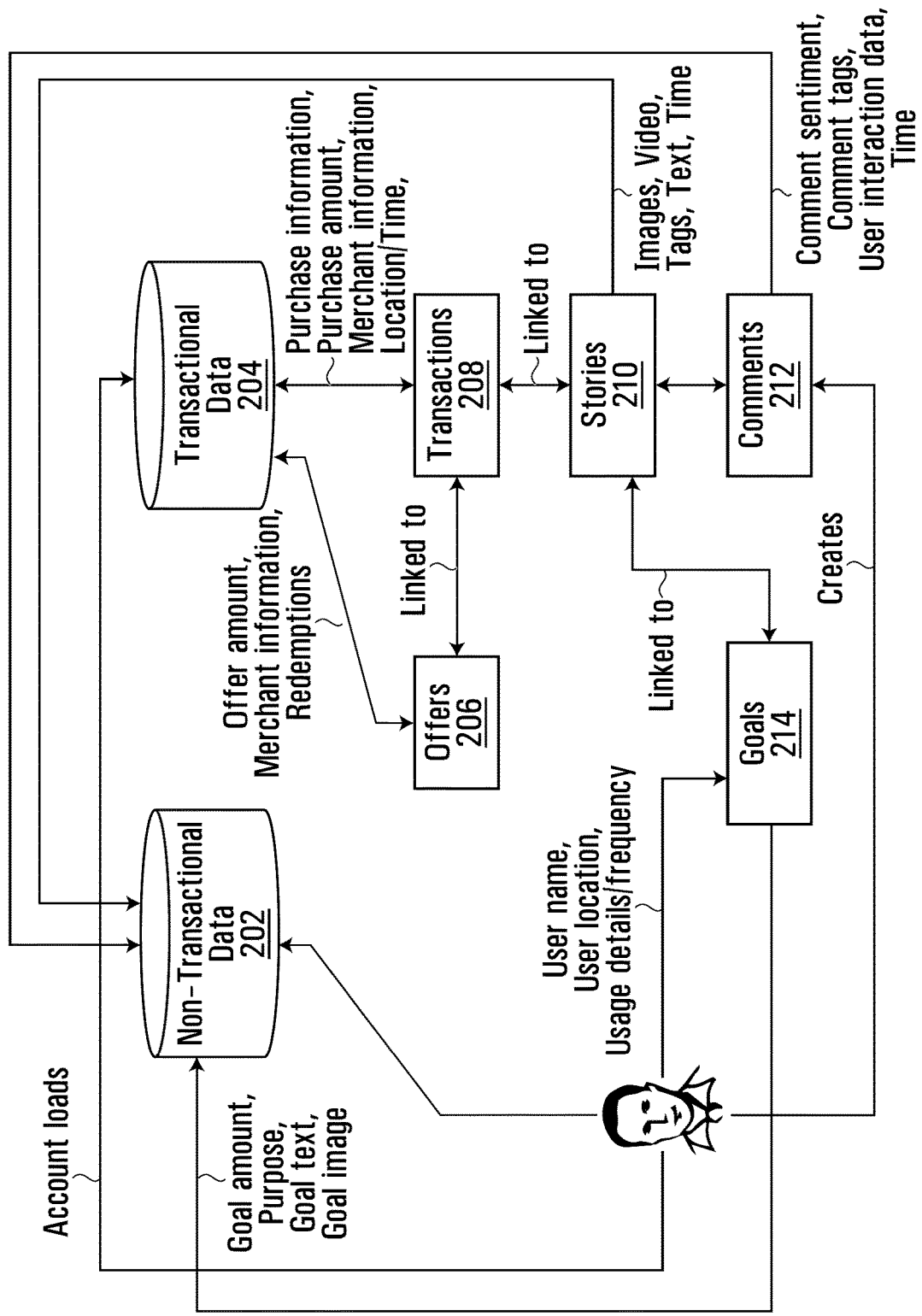
FIG. 2 is a data flow diagram illustrating sample transactional data and social media data types and their relationships, according to some embodiments.

FIG. 2 is a data flow diagram illustrating sample transactional data and social media data types and their relationships, according to some embodiments.

Non-transactional data 202 and transactional data 204 are received at primary server 108. Primary server 108 then is configured to extract, from the non-transactional data 202 and transactional data 204 features that are used to populate and update the multi-dimensional vectors.

Transactional data 204 is then used to track offers 206 (e.g., redemptions or declines), transactions 208, and stories 210 (e.g., social media postings or information), including comments 212. The actions are tracked against goals 214 associated with the user, as provided by population, comparison, and insight engine 122 in comparison with the user's cohort. The point of sale devices, in some examples, includes cryptocurrency-based solutions, including transactions that are settled on a blockchain and/or distributed ledger technology. Where blockchain or distributed ledger technology is included, a scraping mechanism (e.g., a daemon) may periodically or continuously extract transaction information by automatically traversing the ledgers or blockchains.

The multi-dimensional vectors and the primary server 108 provide a data architecture that processes disparate data sets of non-transactional data 202 and transactional data 204 to programmatically extract features transformed from raw information, the extracted features stored in the form of data values suitable for conducting data approximations and neural network processing. This information is extracted from the user's behavior, including purchases information, purchase amounts, offer amounts/redemptions, adherence to goals, social media postings of images, video, tags, text, timestamps, comment sentiments, comment tags, etc.

Each feature can be represented in the form of a dimension, and additional dimensions can be added that are, for example, transformations or non-linear derivatives of the underlying features. Each dimension adds an additional data point for analysis, but a challenge with implementing multi-dimensional vectors is a need for significant memory resources to store the multi-dimensional vectors.

Further, the speed at which the significant memory resources can be accessed may impact the ability of the system to provide responsive functionality. Where reduced memory resources are required, smaller databases and less expensive memory solutions are possible, and improved data techniques, data architectures and data structures are described herein.

Figure 3:
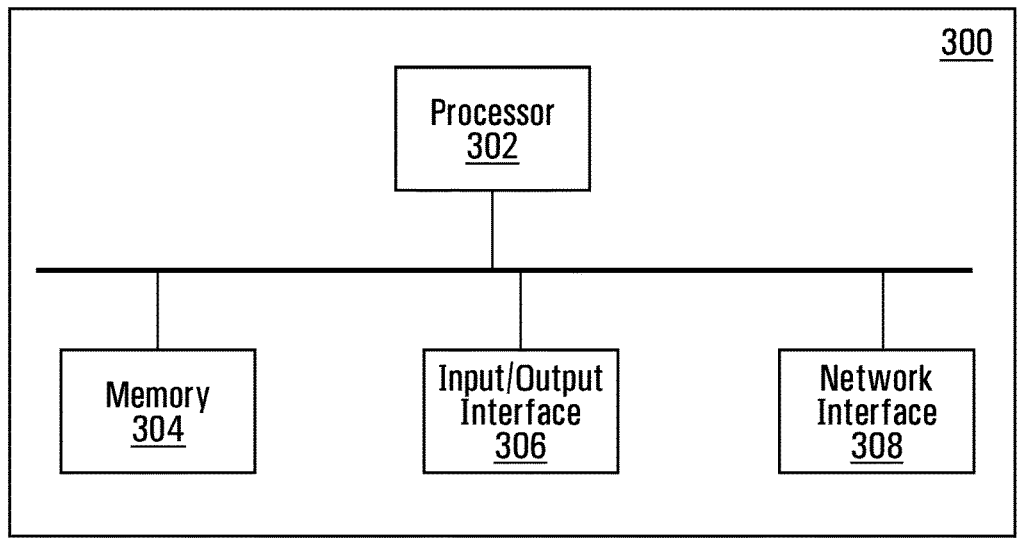
FIG. 3 is a block schematic of a computing device, according to some embodiments.

FIG. 3 is a schematic diagram of computing device 300, exemplary of an embodiment. As depicted, computing device includes at least one processor 302, memory 304, at least one I/O interface 306, and at least one network interface 308.

Each processor 302 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 300 is operable to register and authenticate users (using a login, unique identifier, and password for example) prior to providing access to applications, a local network, network resources, other networks and network security devices. Computing devices may serve one user or multiple users.

The hardware components of computing device 300 can be utilized to implement the four computer servers in the previous figure such as the primary server, recommender engine, and block-chain node.

Figure 4:
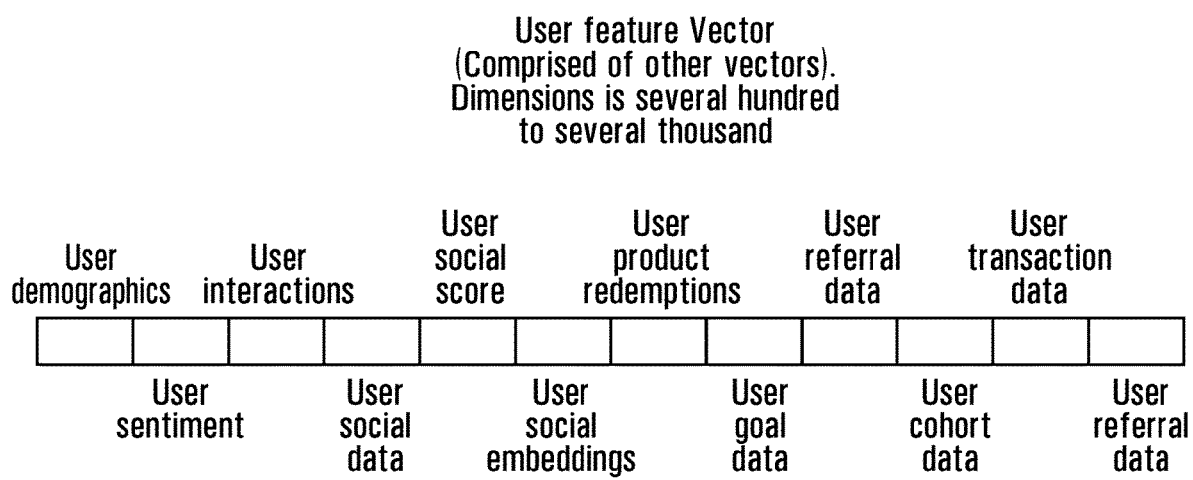
FIG. 4 is an example user feature vector, illustrated in the form of an array storing an example set of dimensions, according to some embodiments.

FIG. 4 illustrates an example user feature vector 4000. Only a subset of dimensions are shown, and the partial subset illustrates demographics, sentiment, interactions, social data, social scores, social embeddings, product redemptions, goal data, referral data, cohort data, transaction data, and referral data, among others. As the user's activity is automatically tracked and monitored, the user feature vector is continuously or periodically maintained such that the feature vector is updated in accordance with data sets representative of the user's activity.

Figure 5:
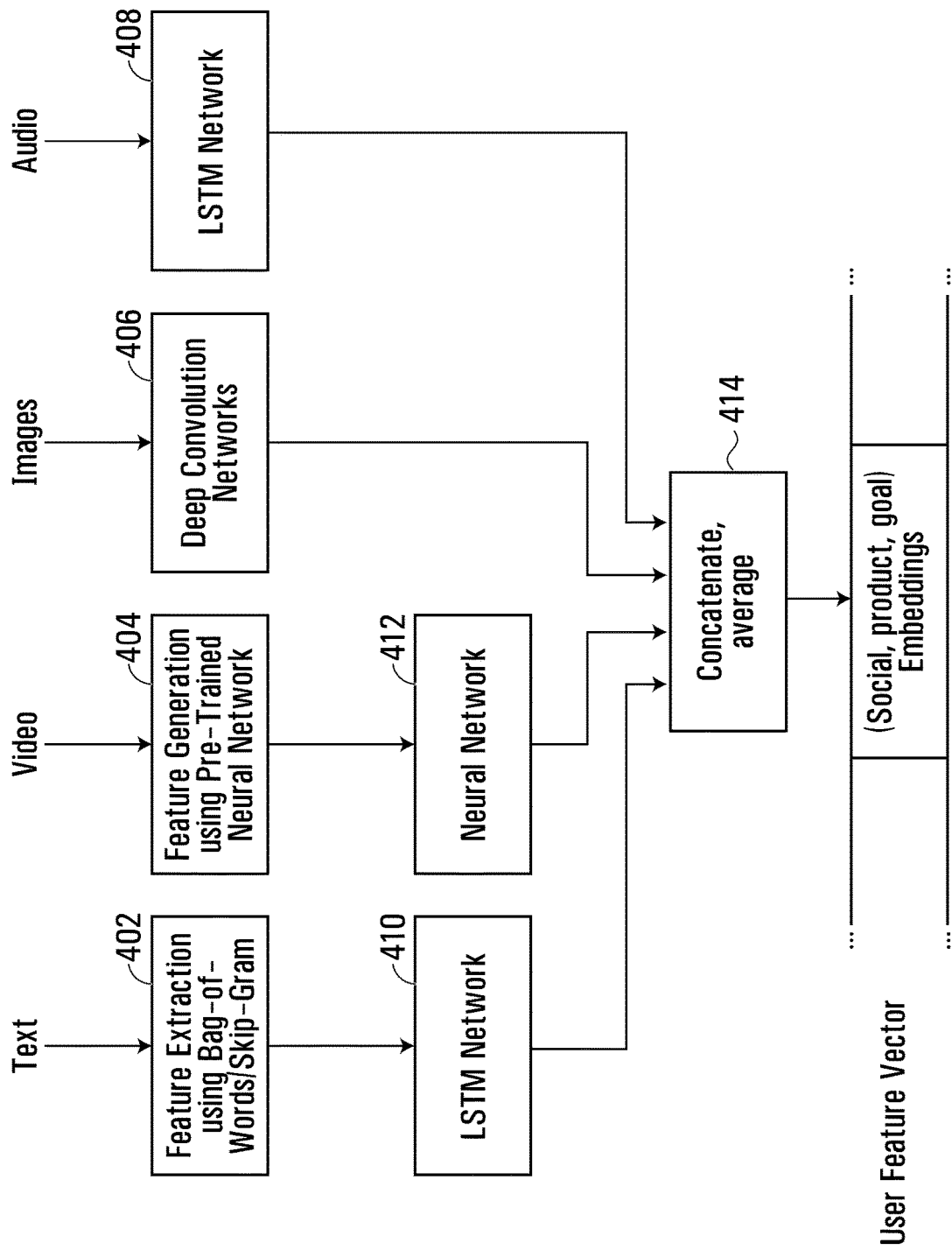
FIG. 5 is a data flow diagram illustrating inputs that can be utilized in generating a combined feature vector, according to some embodiments.

FIG. 5 is a data flow diagram illustrating inputs that can be utilized in generating a combined feature vector, according to some embodiments.

Social networks are an important source of data about users preferences within the system. The user creates stories related to user purchases. These include information such as text, images, and video which is parsed as a source of information for the primary server 108. The users also interact with stories in ways not limited to commenting or liking a story. Text, image and video data extracted from different entities in the system is used as input to the recommender system. This data implicitly provides a similarity score between items, giving the recommender engine 120 more data to learn from. This is a source of user-user interactions combined with purchase information.

The multi-dimensional user vector is updated with from the interactions, such as (but not limited to): demographic information such as age, income, sentiment analysis of posts, stories and texts, other social data such as number of comments and posts, a social score, aggregate embeddings of the user's social interaction, transaction data and related embeddings, crypto-currency transaction information and related embeddings, and cohort-information of the user.

One or more harvester applications (e.g., mobile applications) residing on user computing devices such as client applications 110, 112, or 114 extract social media data including at least one of text, video, images, and audio data associated with the transaction information. Machine learning or other probabilistic identification approaches are utilized to estimate, from the social media data, types of product associated with each purchase transaction. For each purchase transaction, the device generates a temporary multi-dimensional vector representing each type of product associated with the purchase transaction, the temporary multi-dimensional vector storing, in separate dimensions of the vector, numerical values extracted from at least the transaction information and the social data.

Vectors are extracted from various inputs, such as text, video, images, and audio from non-transactional data (e.g., not data received from a point of sale). For these inputs, it is often technically challenging to identify features and relationships. The inputs are pre-processed to extract features and determine relevancy (e.g., did the user take a picture of a coffee he/she just purchased) such that associations (e.g., picture of a coffee related to tracked transactional data) and weights (e.g., confidence scores) can be determined.

Text features are processed using a feature extraction engine using bag of words or skip-gram techniques (among other text parsing techniques), which is then passed through a long short term neural network 410 to obtain additional feature information. Video features are extracted using pre-trained neural networks 404, which an additional neural network 412 is utilized to obtain identified association information for inclusion into a combined feature vector 414. Image data is extracted using convolution neural networks 406, which can be used to identify products or other information from the figures by comparing against a known reference library of products, etc. Audio data is processed using a long short term memory neural network 408.

In addition to contextual data, the user feature vector may be augmented by application usage data which may be but not limited to the number of times a user a viewed an offer, the number of page views a user has, or any interaction such as a clicking a button that the user has with the application. This information may be automatically tracked based on information embedded within the offer (e.g., link information having a referral code or other identifier).

The vectors are obtained by the client application on device 110, 112, or 114, and primary server 108 includes a data receiver configured to receive, from point of sale devices, transaction information data sets representing purchase transactions of each user of the plurality of users, the transaction information including, for each purchase transaction, at least a user identifier, an approximate location of purchase, a time stamp, a retailer, and a price. The features obtained in the combined feature vector 414 are associated with purchase aspects from the transaction information.

The numerical variables stored in each array element include at least both raw data values and transformed data values, the transformed data values determined by applying non-linear transformations (e.g., cubic or log versions) to the raw data values, the transformed data values reducing a number of training cycles otherwise required by the recommender neural network to recognize non-linear patterns correlating redemption behavior and each array element of the plurality of array elements.

The combined feature vector 414 is adapted as a temporary storage mechanism that is used to update the feature vector for a particular user, updating it to incorporate the new transactional or non-transactional information to shift its positioning in a vector-based n-space representation. In an embodiment, the feature vector is updated such that an average of all interactions is taken. In another embodiment, more weight is given to more recent interactions. In yet another embodiment, the vectors are limited to only a predefined (e.g., 50) set of recent interactions.

In a simplified, non-limiting example. suppose a user has two previous coffee-related transactions in the form of {amount, embedding Take the previous transactions as {5.0, embedding('starbucks')}, {3.0, embeddings('starbucks')}. The current average is {4.0,embedding('starbucks')}. Suppose a new transaction at a restaurant is made {10,embedding('Pizza Hut'} is {5+3+10/3=6.0}, the result of adding a embeddings and rescaling them. In an example approach of some embodiments, the system is configured to apply more weight to recent events than old events. For example, a decayed weighting-average is applied. For example, through appropriate weighting in the previous example for recency may be {8.0, embedding that is closer to 'Pizza Hut'}.

If each vector represents a point in n-dimensional space, an aggregate vector can be formed from each user's corpus of transactions, the aggregate vector being updated whenever a transaction or interaction is obtained. The aggregate vector can be utilized for downstream data analysis to, for example, apply distance calculation techniques or other pattern recognition approaches to identify patterns in behavior between users.

Groups of users may be plotted as "constellations", wherein similarities across multiple dimensions can be analyzed together, the constellations exhibiting clustering behavior through estimations of their user behavior as indicated by the maintained data structures. The clustering behavior, determined, for example, by way of informational distances, can be utilized to generate computer-based predictions of whether a user would be interested in a particular reward or reward program (e.g., as defined by distance to a vector representing the reward). The contribution of different dimensions (e.g., correlation, cross-correlation) is processed by a neural network to determine patterns and trained against actual behavior, such that predictions are tuned over time to correct for an error value between predictions and actual behavior.

Example algorithms and pseudocode are provided below in relation to determination of image features, and video features.

---

Algorithm 1 Calculate Image features for an Image I: getImageFeatures( )

Require: A trained Image Neural Network
    imageFeatureVector ← [φ]
    detectedObject ← detectObjectFromTrainedNeuralNetwork(I)
    append(imageFeatureVector.detectedObject)
    if Image has a geo-tag then
        latitude.longitude ← getAssociatedGeoTAG(I)
        append(imageFeatureVector.latitude.longitude)
    end if
    return imageFeatureVector

---

Algorithm 2 Calculate Video features for an Video V: getVideoFeatures( )

Require: A trained Video Neural Network
    videoFeatureVector ← [φ]
    detectedObject ← detectObjectFromTrainedNeuralNetwork(V)
    append(videoFeatureVector.detectedObject)
    if Video has a geo-tag then
        latitude.longitude ← getAssociatedGeoTAG(V)
        append(videoFeatureVector.latitude.longitude)
    end if
    append(videoFeatureVector,lengthInSeconds(V))
    return videoFeatureVector

---

Figure 6:
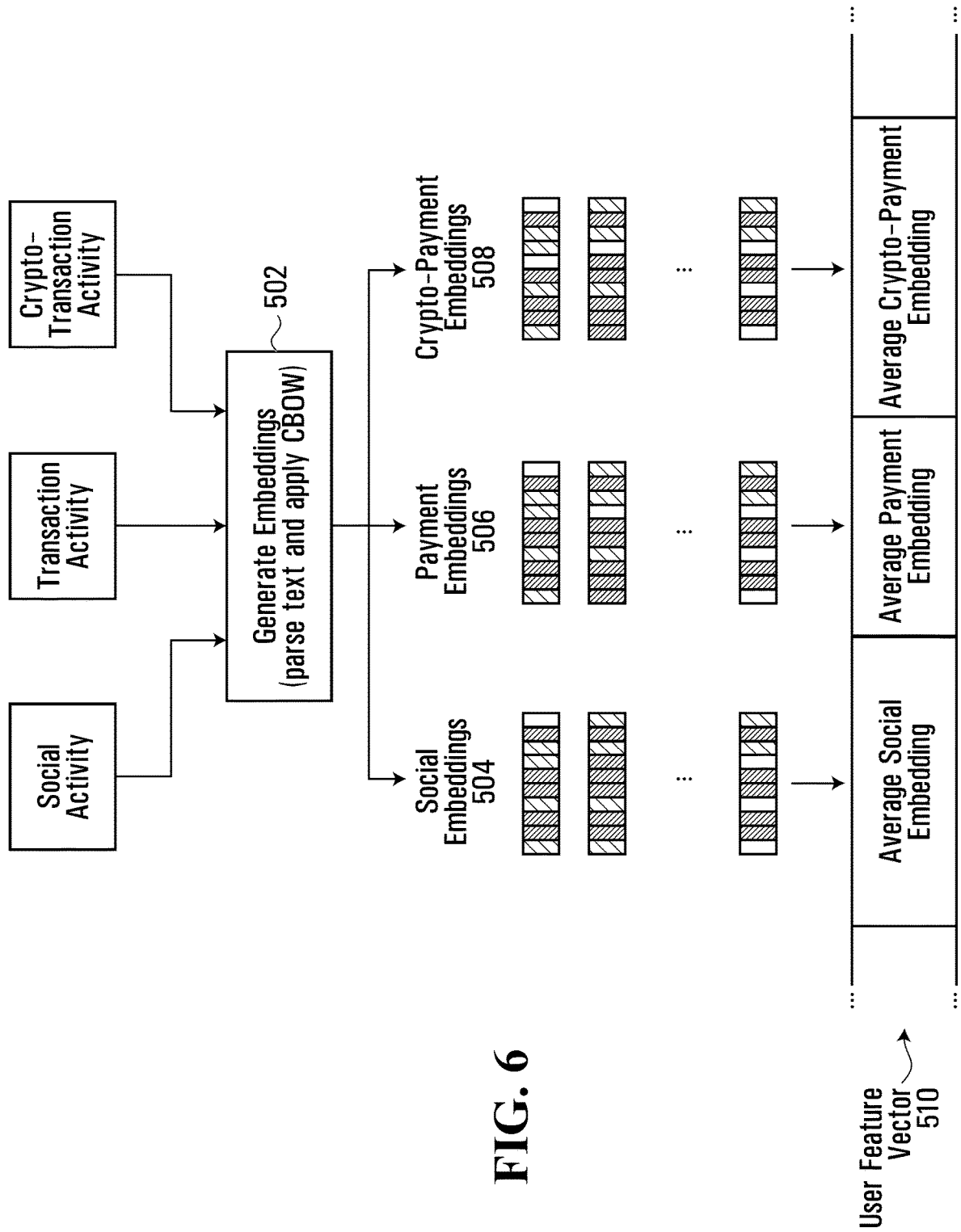
FIG. 6 is a data flow diagram illustrating the generation of updated data sets transformed into vectors for embeddings that are incorporated into a feature vector, according to some embodiments.

FIG. 6 is a data flow diagram illustrating the generation of updated data sets transformed into vectors for embedding that are incorporated into a feature vector, according to some embodiments.

The temporary multi-dimensional vector is used to update an aggregated multi-dimensional vector generated from a corpus of purchase transactions associated for the user by incorporating the temporary multi-dimensional vector into the aggregated multi-dimensional vector. Social activity, transaction activity, and crypto-transaction activity are embedded into the aggregated multi-dimensional vector.

This aggregated multi-dimensional vector represents, over time, a view of the user's purchasing behavior as a point in n-dimensional space. For example, if a user A pursues coupons, typically purchases off-brand generic items, from stores generally located in rural Michigan, such features will be present in the aggregated multi-dimensional vector.

As the purchase behavior shifts over time, the point in n-dimensional space established by the aggregated multi-dimensional vector is modified through each update. For example, where the user then switches to online shopping, and develops an outdoorsman-type hobby on retirement, the point in n-dimensional space will begin to reflect these changes.

Embeddings are generated at 502. "Embeddings" 502 are additional dimensions generated to track context and sentiment analysis obtained from the non-transactional data sets. These additional dimensions are helpful in tracking extractions of non-linear relationships and/or derivative features that are not readily present otherwise in raw data. There are different types of embedding, including social embedding 504, transaction embedding 506, and cryptocurrency embedding 508.

For example, the context in which purchases are made is often intricate and non-periodic. As context, a user is likely to buy a Sony™ TV on black Friday in his/her home town each year if the price is equivalent to less than a week's salary. A way to learn complex non-linear relationship is to pass in all data related to the each years purchase along with all the context variables such as (date, income, location), encoded correctly and train for a large number of iterations.

In order to learn complex non-linear relationships in data, the primary server 108 is configured to adds layers such as RELU or sigmoid layer to a deep neural network.

This adds to the complexity of the representations that are learned by the system. In order to aid and speed-up the learning multiple features are generated for each feature, for example if x is a feature, the features $x^3$ and $\log(x)$ are added as inputs to speed-up learning super-linear and sub-linear relationships in the data.

The primary server 108 learns vector embeddings for each user activity such as a transaction, a social story or comment. This gives a fixed length vector that can represent the context in which user activity takes place, each video, image, transaction, or any other user activity is parsed and converted into a fixed length vector. The vector embeddings are built in a computationally efficient manner using methods for generating embeddings such as continuous bag-of-words or skip-gram models.

Problems are encountered when encoding temporal activities of a user (such as liking several similar posts on a social net or similar cryptographic transactions). This is solved, for example by, taking the average 510 of all embeddings for the user for that particular activity. These embeddings are added for all the remaining types of data being added to the user's multi-dimensional vector at 512.

Social networks often follow power-law distributions. This refers to a finding that only a few nodes are highly coupled. Social networks can be regarded as scale-free with short distances between any two users.

Power law distributions are mathematical distributions of the form: $f(x) = \alpha x^k$ with a probability distribution given by:

$$p(x) = \frac{\alpha}{x_{min}} * \left(\frac{x}{x_{min}}\right)^{-\alpha}.$$

A few users will have many incoming or outgoing communications, while a majority of users are in the "long-tail" with no significant activity. This is likely to be an accurate distribution for other activity measures such as cryptocurrency purchases of users.

By classifying users with respect to their position in the power-law distribution users can be identified who have large influence and a large number of interactions with others. These users are of interest to retailers as they are targets to promote products or be targets of exclusive offers. Feature engineering according to power-law distributions is an innovative aspect of the system. Power-law distributions can be used to rank users in priority order such that communication activity can be used as a filter, for example, to determine efficient memory usage by utilizing the prioritized order to ensure that high-priority user feature vectors are not stored in a dense representation, despite having a large number of zero-value dimensions. Conversely, power-law distributions can also be used in accordance with a priority ranking to store lower ranked user feature vectors in a dense representation.

Every offer that is entered into the system may have a referral number or cost. Rather than simply being the number of times a particular offer is allowed to be shared by, it represents a remaining amount the user is allowed to share an offer. For example, user A may share 6 exclusive offers with users from the same demographic (similar user feature vectors) but may only be allowed to share 2 exclusive offers with highly dissimilar users. How similar users are determined may be based on a computed Euclidean distance or a computed correlation value.

In a clarifying, non-limited example, the Euclidean value for a distance may be determined using a Pythagorean or other approach, whereby a subset of the dimensions are used to determine a distance in N dimensional space. This distance can be normalized to establish a pseudo-correlation score representative of the system's estimation of a difference or other type of distance measure between users, which is then utilized to determine an effective "cost" of sending a referral to the other user. As noted in the example below, a user may be able to share 10 offers with similar users or only 2 with dissimilar users, the similarity estimated from the user feature vectors.

For example for an assigned cost of 10 for a reward given to a targeted user device. The user is allowed to distribute 10 offers to users exactly like itself (10*1.0) or 5 users with a similarity score of 0.5 (moderately dissimilar, 10*0.5=10) or only 1 user who is extremely dissimilar with a similarity score of 0.1 (10*0.1=10).

An example of determining if a user is social or non-social is given below. The system processes all users and calculates the outdegree and indegree of each user. It then attempts to fit a power-law curve to the data (separately for out-degree and indegree).

Assume that the \alpha for both parameters is 2. The complementary cumulative distribution function can now be given as $P(x) = (\frac{x}{x_{min}})^{-\alpha+1}$. Taking $x_{min}$ as 1 and \alpha as 2. as our example network parameters, if a user has 10 comments+stories, their outdegree is 10. The probability of a user having more than 10 posts is $(10)^{-2+1}$ which is 10%.

A similar calculation can be done for indegree. The system classifies users as social if the probability of both outdegree and the degree of the user is below a certain threshold. For example, setting 10% as the threshold for the current example requires an indegree and outdegree of more than 10 each. This prevents a user with a very high outdegree (possibly a spammer) from being classified as a social user if other users are not interacting with it. Taking the previous example: A user with outdegree 100 but indegree 1 would not be in the top 10% by indegree and hence is 'non-social'.

Vectors for users who are considered 'social' are required to accessed more frequently by the system as 'social' users are frequent targets for distributors of rewards. This reduces the operational time taken to access the most used user feature vectors.

The estimation of the parameters $\alpha$ and $X_{min}$ on the dataset are required to get the probability of a sample. These parameters are found out using the Kolmogorov-Smirnoff (KS) score to determine the best values of the parameters that minimize the KS distance. The probability value is used as a score and falls in the range 0-1.

Figures 12, 13:
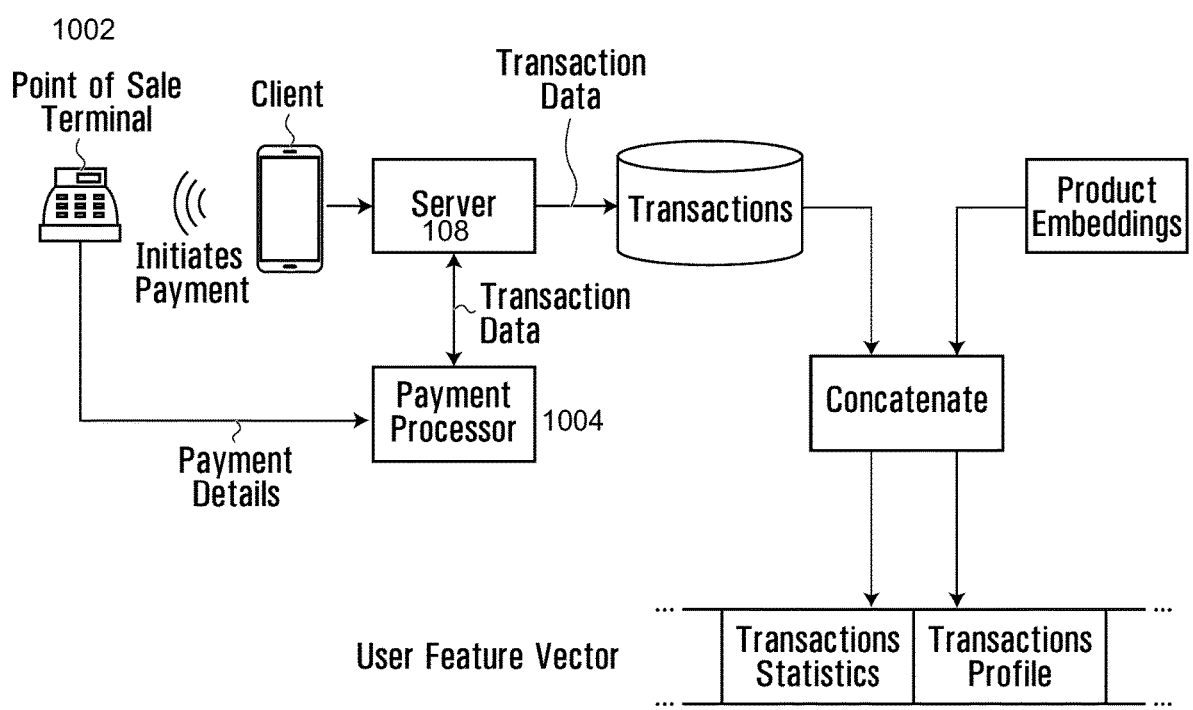
FIG. 12 is a partial view of an example vector storing a series of numerical integer variables, and information stored in data structures representative of a feature vector, according to some embodiments.
FIG. 13 is a block schematic of a point of sale and payment processor, according to some embodiments.

The aggregate embeddings of each user comment and story as well as goals is added to the feature vector. Sample conversion of a part of a user's social activity is shown in FIG. 12 as an example feature vector for a user's social activity which denotes whether a user is in the top 5% with regards to comments, likes or stories.

An example algorithm approach to calculate social interaction vectors using power-law distributions is provided below:

---

Algorithm 4 Calculate Social interaction features vector for a User U given a power-law distribution parameter ∝ extractSocialFeatures( )

--- socialVector ← [φ]
interactionVector ← [φ]
append(socialVector.totalNumberOfLikesReceivedByUser)
append(socialVector.totalNumberOfCommentsReceivedByUser)
append(socialVector.totalNumberOfStoriesOfUser)
while There exists a social interaction (comment, like j with type i and index j $I_{ij}$ with the user
U not considered do
   if isBinary($I_{ij}$) then
      interactionVector$_{ij}$ ← ]
   end if
   if isMultiLevel($I_{ij}$) then
      interactionVector$_{ij}$ ← NormalizedValue($I_{ij}$)
   end if
end while
flattenVector(interactionVector)
append(socialVector.interactionVector)
outdegree ← numberOfInteractionsByUser(U)
indegree ← numberOfInteractionsOnUserItems(U)
degreeRatio ← outdegree/indegree
append(socialVector.degreeRatio)
socialScore ← I getProbabilityFromPowerLaw(outdegree.indegree.α)
append(socialVector.socialScore)
append(socialVector.generateEmbeddings( )
return spcialVector

---

Figure 7:
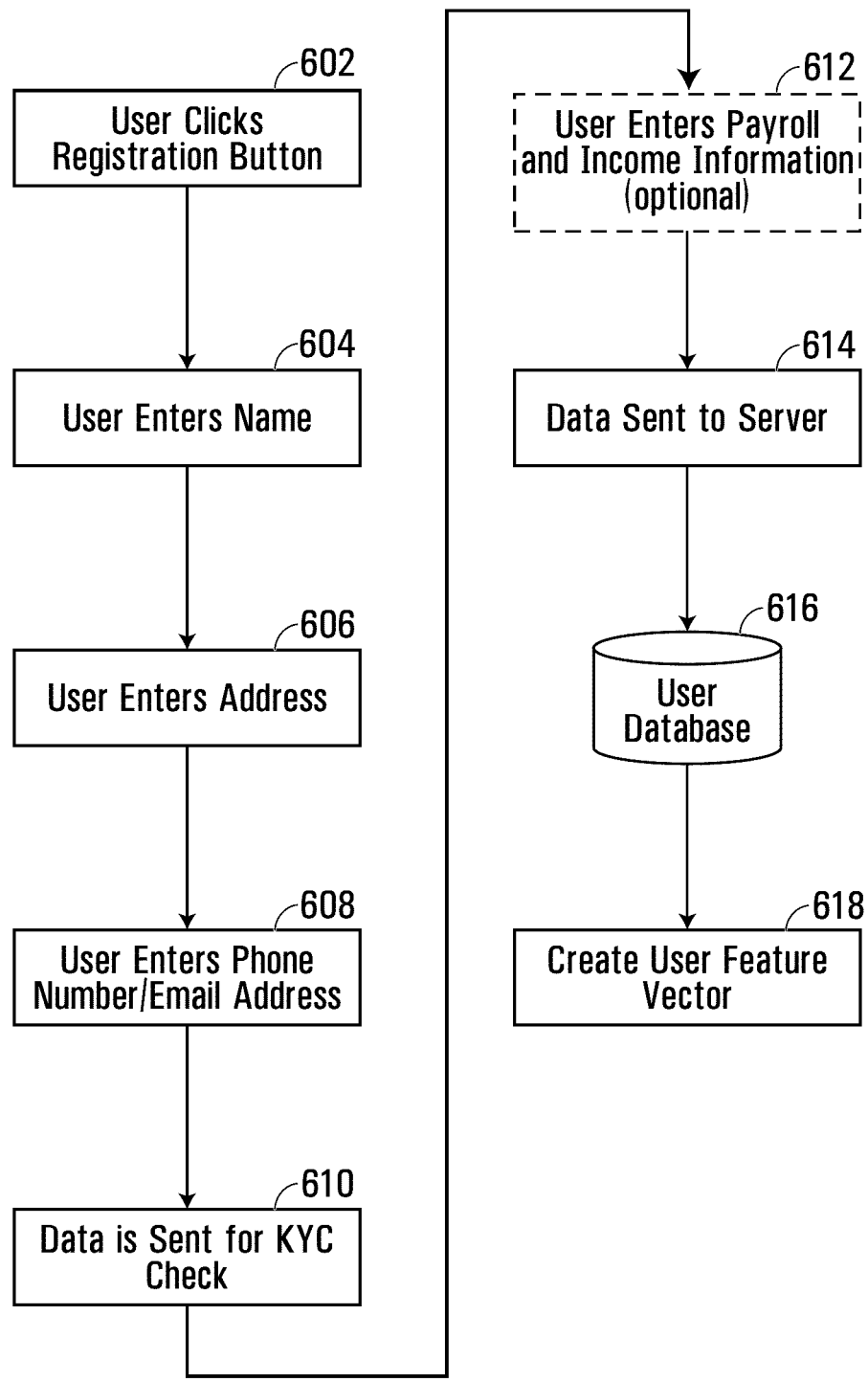
FIG. 7 is an example information gathering method, according to some embodiments.

FIG. 7 is an example information gathering method, according to some embodiments.

The clients supply personal information such as and not limited to name and address during the registration stage for users. The client potentially could enter information such as annual income and other details. The process for registration is shown in FIG. 7, through steps 602, 604, 606, 608, 610, 612, 614, 616, and 618. This information is used to generate the first instance of the user's multi-dimensional feature vector.

FIG. 8 is an example set of information associated with a user profile, according to some embodiments. This also includes payroll information that the user may choose to provide. Sample payroll information is shown in FIG. 8.

FIG. 9 is an example flow depicting information captured from an example comment, according to some embodiments. At 9002, the user activates and redeems the offer. At 9004, the purchase and offer information is published on a screen of the mobile application. At 9006, the transaction is "liked" and commented upon by other users, and at 9008, the comment and its associated metadata and information is scraped from the server by an automated extraction mechanism (e.g., periodic daemon process). The comment and the associated metadata is processed using, for example, a neural network with long short term memory modules to output a sentiment score (e.g., 0.67). This sentiment score is used to update the user feature vector (e.g., modifying an average sentiment score).

Figure 10:
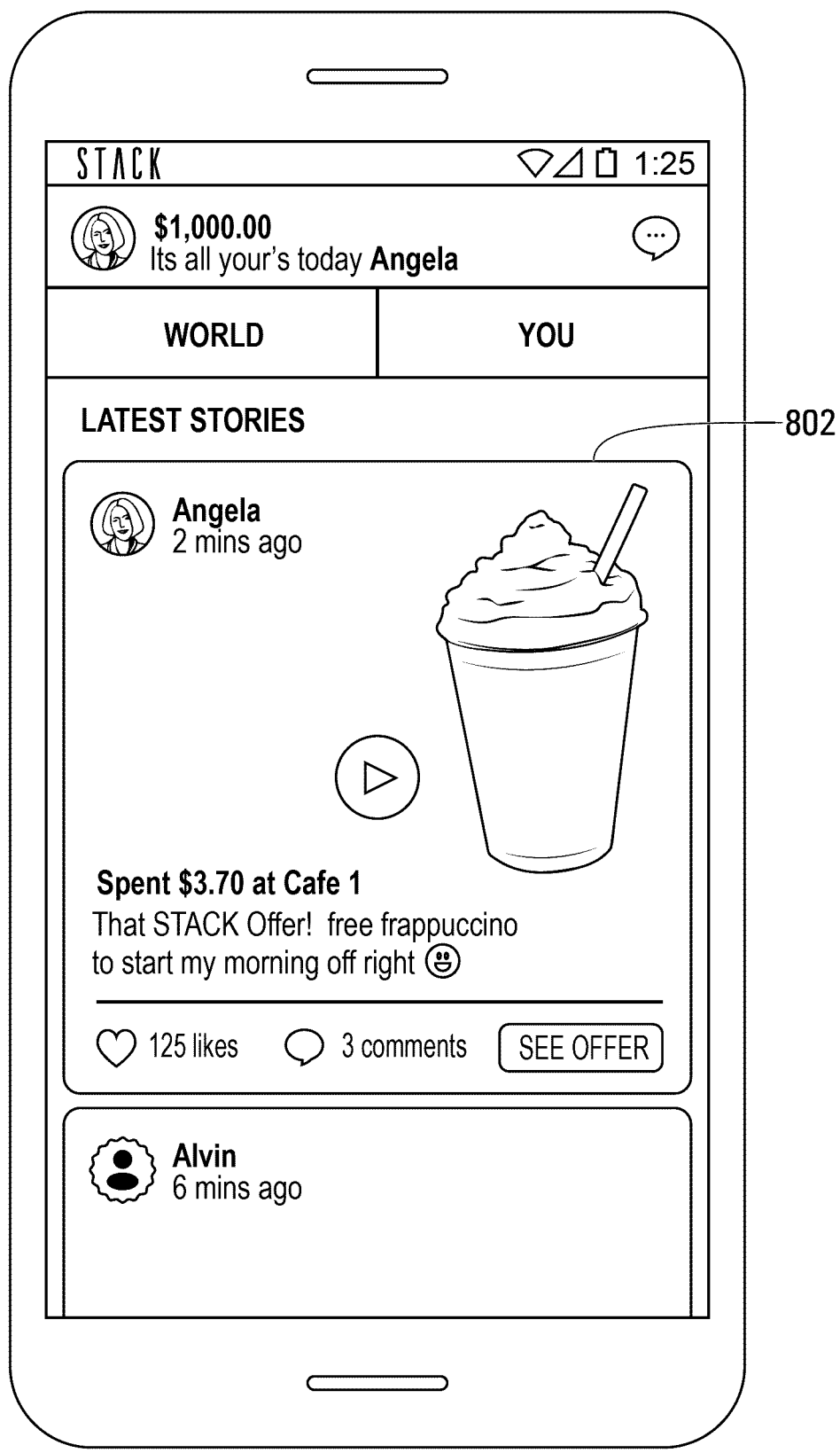
FIG. 10 is a screen depiction provided on a display of a device controlled to render visual elements of a mobile application, the screen depiction including an offer presented to the user, according to some embodiments.

FIG. 10 is a screen depiction provided on a display of a device controlled to render visual elements of a mobile application, the screen depiction including an offer presented to the user, according to some embodiments.

An example story 802 is shown, the story is explicitly linked to a transaction which reduces the problem of determining whether a social media object involves a transaction. Other users of the system can comment, like, and share the story, providing further insight on brand perception and market awareness. The system links each user story to a transaction in the data store 118 which reduces the problem of associating transactions with social network data.

Figure 11:
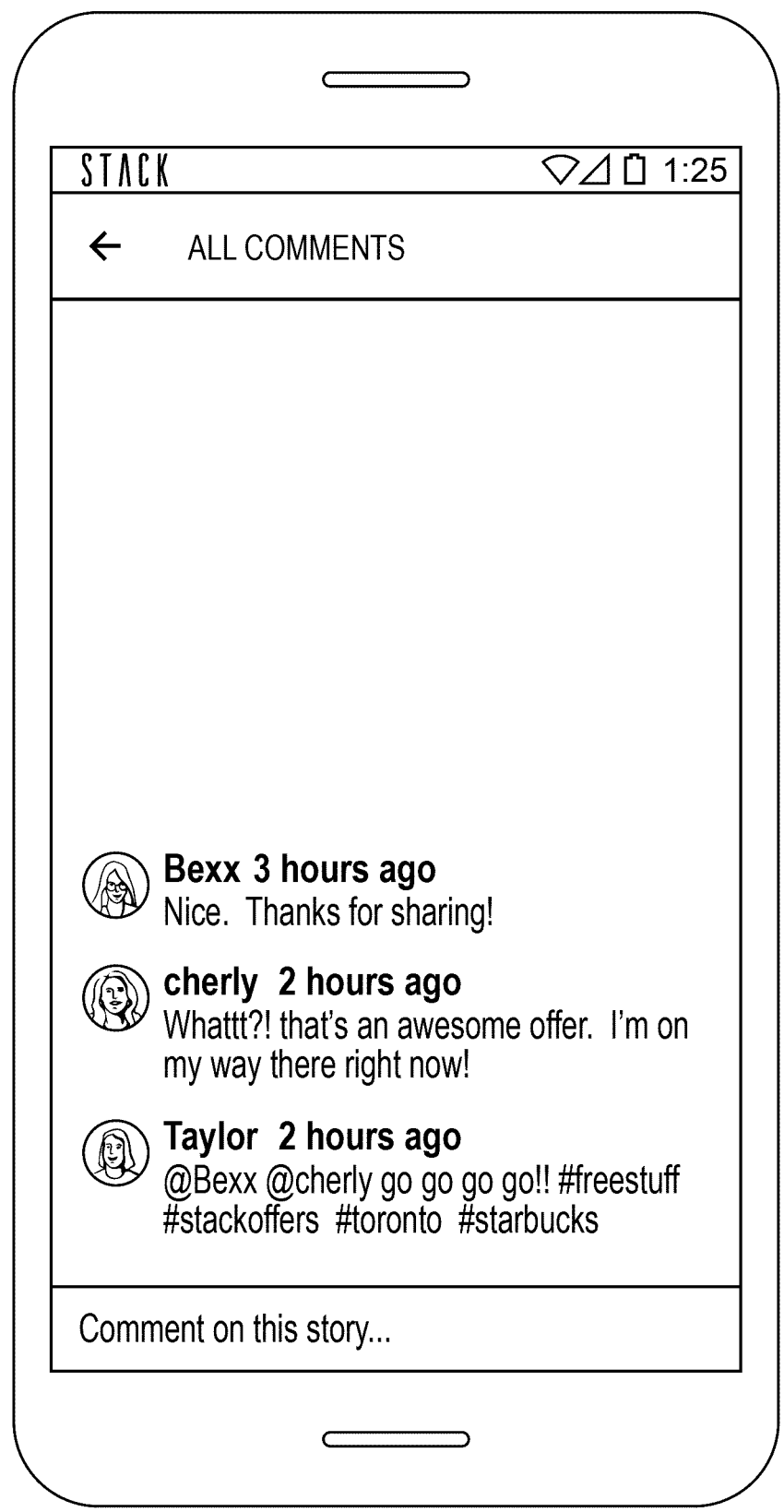
FIG. 11 is a screen depiction provided on a display of a device controlled to render visual elements of a mobile application the screen depiction illustrating a social media discussion over text associated with a transaction or an offer, according to some embodiments.

FIG. 11 is a screen depiction provided on a display of a device controlled to render visual elements of a mobile application the screen depiction illustrating a social media discussion over text associated with a transaction or an offer, according to some embodiments. Examples of user comments on a story are shown at 902. Sentiment analysis and data are extracted from comments.

Sentiment analysis is an important indicator of how a user feels towards an entity such as a person or brand. Sentiment analysis is performed on every user comment and story. Neural networks have to be trained on a large corpus of text in order to derive sentiment from them. In some embodiments, primary server 108 is configured to track sentiment and include the information in conjunction with the generated embeddings for updating the user's multi-dimensional feature vector.

FIG. 13 is a block schematic diagram illustrating the storage of a transaction originating as a data set received from a point of sale terminal as one or more elements of a user feature vector, according to some embodiments. The payment processor 1004 receives payment details, extracts transaction data for providing to the primary server 108. The transaction data is stored in the form of transactions, which are concatenated with product embeddings (e.g., sentiment analyses, any identified products), and stored in the user feature vector in one or more dimensions of the vector. For example, the details may be stored both in relation to a transactions profile and transaction statistics.

The processor 1004 may be provided as part of primary server 108 which receives transactional information for fiat currency transactions the user multi-dimensional feature vector by extracting information from a point of sale terminal 1002 and/or a payment processor 1004. The system may track or cause the creation of a banking account for each user. The bank account is handled by a payment processor. The BIN (Bank Information Number) of the account is held by a registered financial institution such as a bank.

The server pulls transactional data directly from the payment processor 1004 over a communication network. The information may include payment details such as price, date, location, point of sale terminal, etc.

FIG. 14 is an example data flow illustrating raw information that is processed to generate a vector data structure, according to some embodiments. The information received is shown as 1102, and can include, for example, data regarding user top-ups and direct deposits into the account from another bank account (for example, loading money into the system using another bank's debit card. This information is processed using a data processing submodule 1104 in the primary server 108, and vector updates are shown at 1100. The raw data may be provided in the form of various character strings, when are then processed to generate the dimensional variables stored in the user feature vector.

Additional information relating to savings goals can also be added via the vector updates, and the following is an algorithm to calculate spend/save ratios, etc.

---

Algorithm 3 Calculate.spend/save ratio and goal related features for a user U: extractGoalFeatures( )

---

Require: At least some spending/saving data on user U with some Goals.
  goalsVector ← [φ]

-continued

```
Algorithm 3 Calculate.spend/save ratio and goal related features
          for a user U: extractGoalFeatures( )

AverageGoalAmount ← 0
calculateAverageGoalAmount( )
append(goalsVector.AverageGoalAmount)
append(goalsVector.medianAmount(Goals)
append(goalsVector.standardDeviation(Goals))
spendSaveScore ← calculateSaveScore(U)
percentOfGoalsAchieved ← calculateGoalsScore(U)
append(goalsVector.spendSaveScore)
append(goalsVector.percentOfGoalsAchieved)
return goalsVector
```

Each offer is a discount or reward on a product. It contains information such as a location, expiration time, merchant name, amount. Each offer may in addition contain assets such as images and video which may be a parsed using neural networks to generate descriptive text (e.g., generating the text 'coffee cup' from an image in a story). The product feature vector is calculated by generating embeddings from a product text, along with the amount, duration, location embeddings and merchant name embeddings, along with other information such as number or cost of referrals allowed per user. For each user an aggregate product embedding is added to the user feature vector, which is an average of all the offers/products that the user has redeemed or used in the past. This is important data on user preferences.

Figure 15:
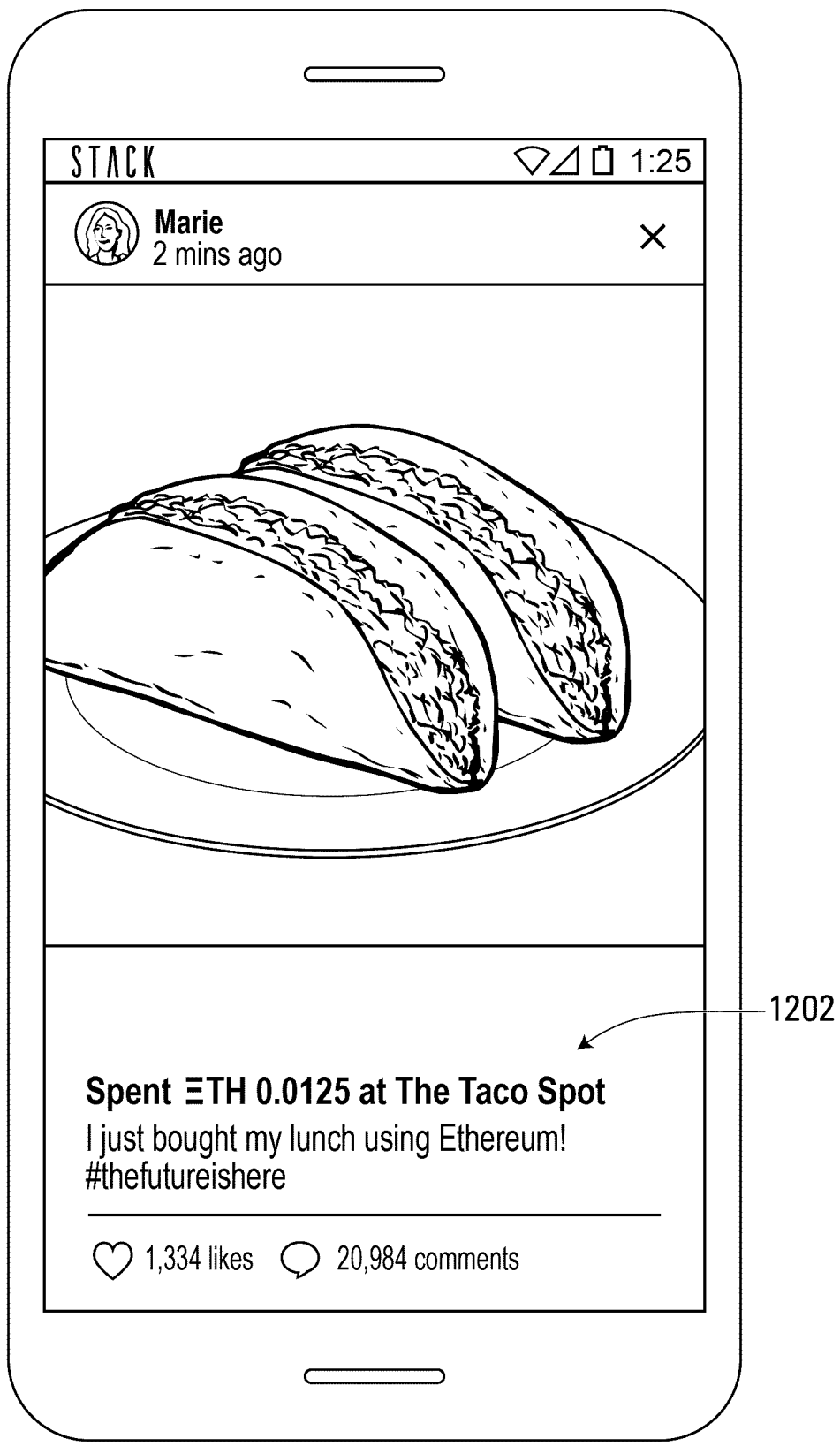
FIG. 15 is a screen depiction provided on a display of a device controlled to render visual elements of a mobile application, the screen depiction including a concluded transaction along with an image posted to social media, according to some embodiments.

FIG. 15 is a screen depiction provided on a display of a device controlled to render visual elements of a mobile application, the screen depiction including a concluded transaction along with an image posted to social media, according to some embodiments. The transaction 1202 shown is a cryptocurrency transaction.

Figure 16:
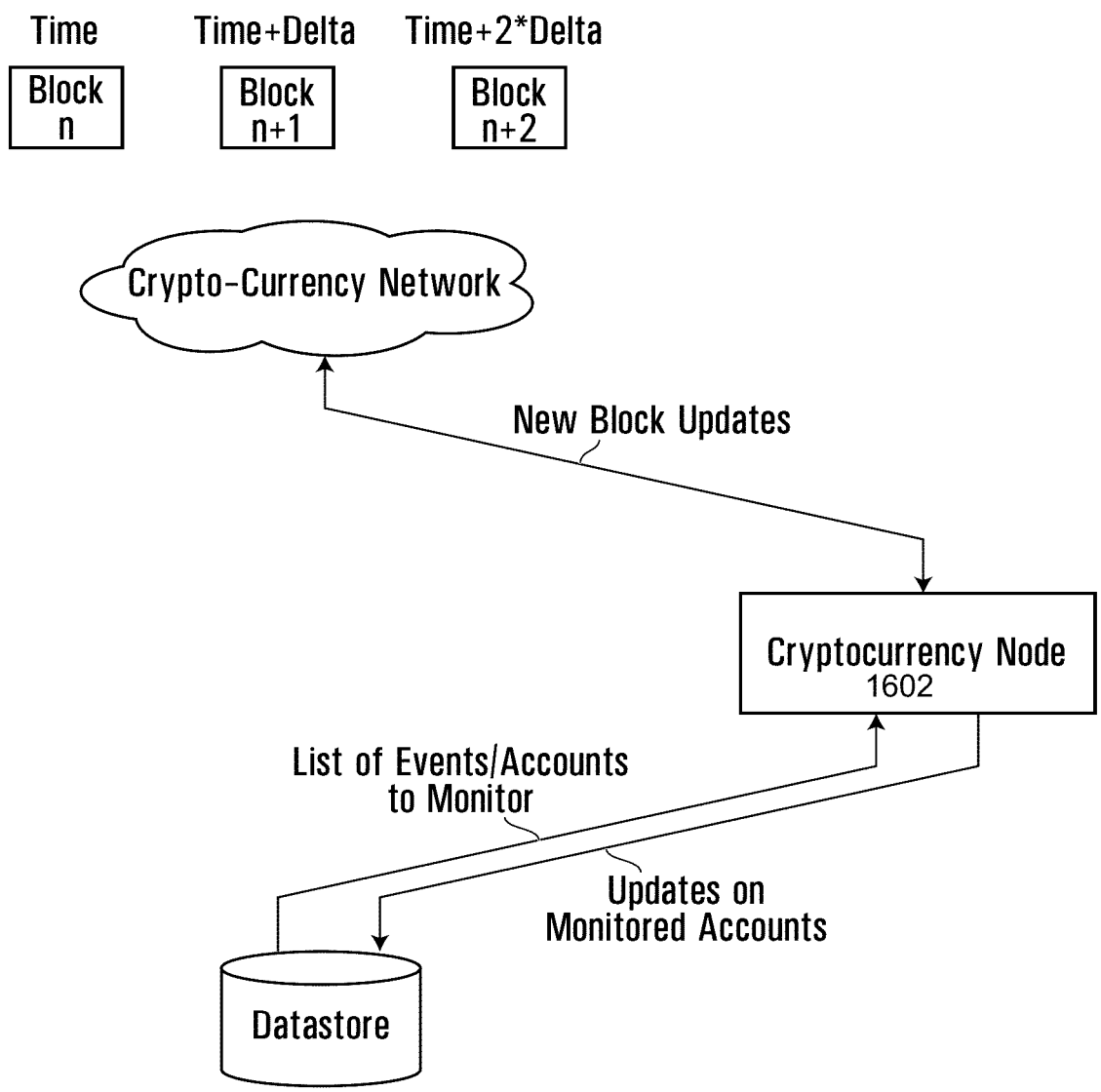
FIG. 16 is a block schematic depicting a system for tracking new block updates and tracking events/accounts to monitor, according to some embodiments.

FIG. 16 is an example block schematic of a cryptocurrency node 1602 that is configured to receive and track block updates for converting and generating lists of events and accounts to monitor, as well as updates on monitored accounts, which are stored in the data store of the system.

Figure 17:
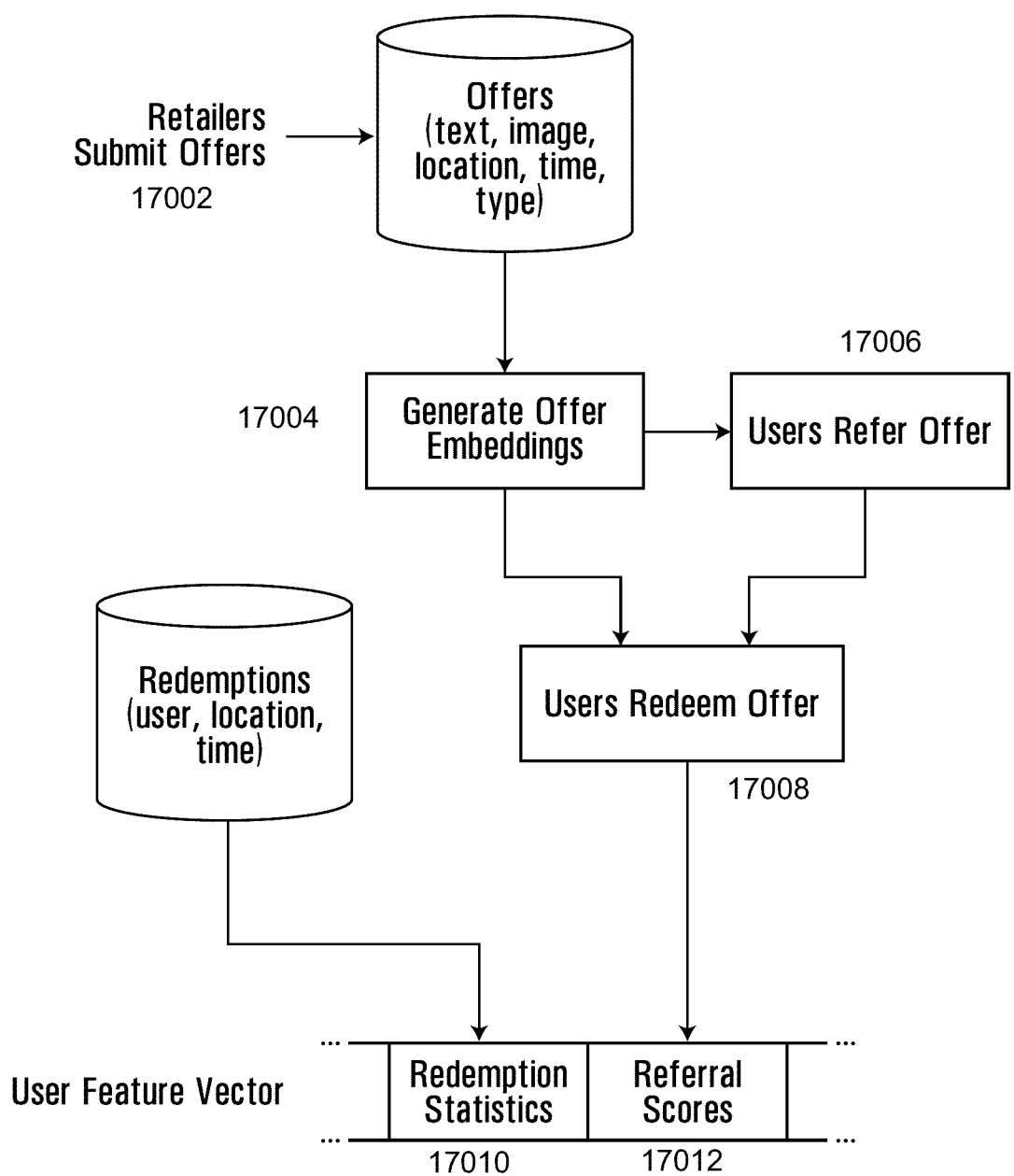
FIG. 17 is a process flow diagram illustrating a sample method for tracking offer submission and redemption, according to some embodiments.

FIG. 17 is a process flow diagram illustrating an example process for tracking offer embedding, provisioning, and redemption, according to some embodiments. At 17002, retailers submit offers, which are stored in a data store capturing at least one of text, image, location, time, and type (e.g., as metadata associated with a data record). Offer embeddings are generated at 17004, and the offers may be referred to other users at 17006. A user may redeem an offer at 17008, and all of this information is tracked in terms of data sets stored at and redemption statistics 17010 and referral scores 17012. In some embodiments, offer embeddings are directly entered into user feature vectors as dimensions, indicative of characteristics that have been provided to a particular user or group of users. Similarly, redemption statistics 17010 and referral scores 17012 in some embodiments are developed as a corpus of data points whose average may be captured, or a rolling average of the most recent data points. In some embodiments, rather than tracking the offer itself, the user feature vector stores average vector distances computed for offers provided, offers redeemed, and/or offers declined, the vector distances computed as between corresponding user feature vectors and vectors representing offers. These vector distances can be generated based off of all or part of the multi-dimensional vectors, and may represent a computer-generated estimate of how likely or unlikely a user is to redeem an offer. For example, for a user whose user vector indicates that the user typically purchases low-priced mens clothing in low-priced suburban areas, there may be a high vector distance determine when compared with a vector for women's clothing from a urban retailer of high-end fashion.

Figure 18:
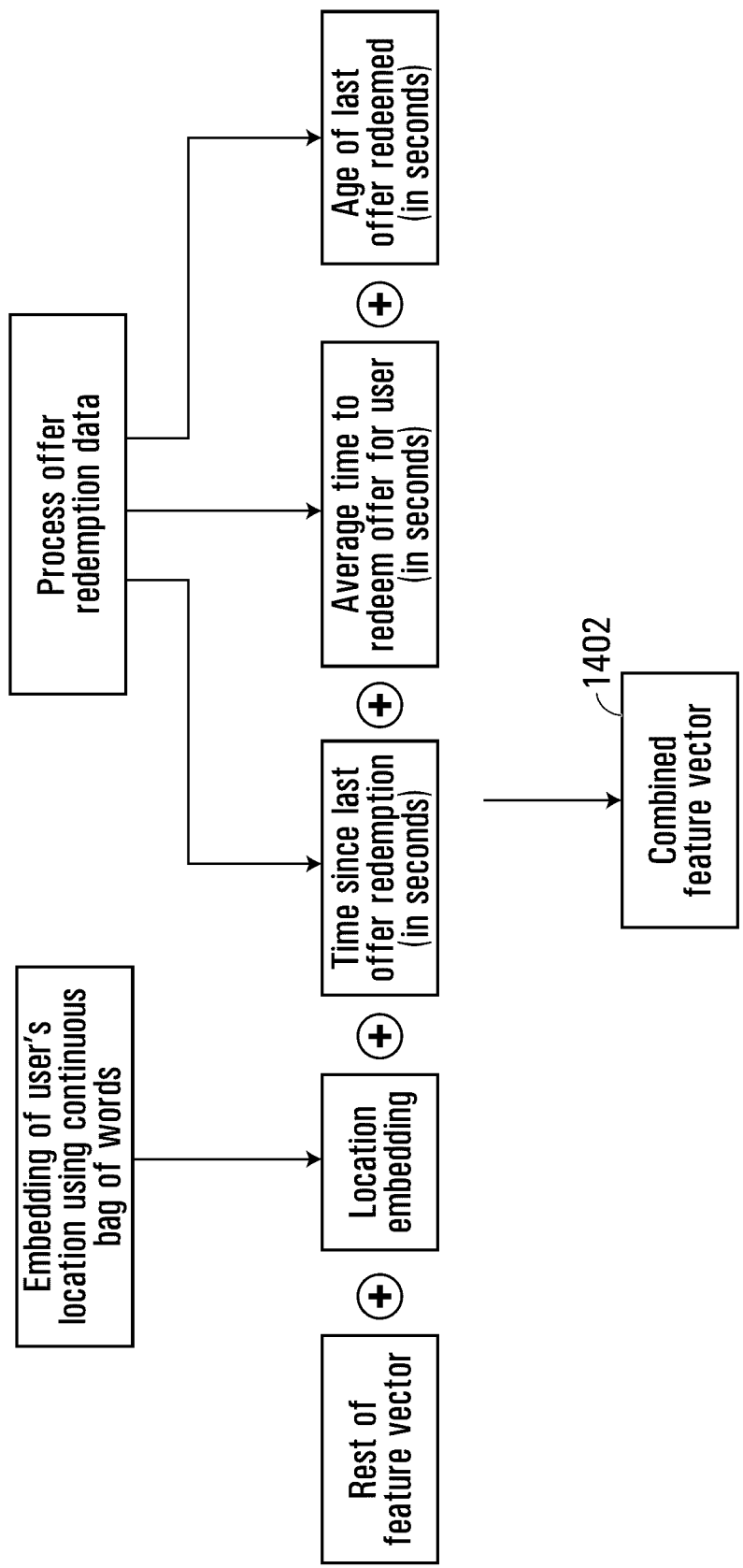
FIG. 18 is an example data flow and process for updating a feature vector to generate a combined feature vector, according to some embodiments.

FIG. 18 is an example data flow and process for updating a feature vector to generate a combined feature vector, according to some embodiments. Embeddings can occur in relation to non-transactional data, such as comments and location on which a social media post as made, and offer redemption data may also be extracted based on a review of time since last offer redemption, an average time to redeem, and/or an age of the last offer redeemed. These embeddings can be used to update the user's feature vector 1402.

Figure 19:
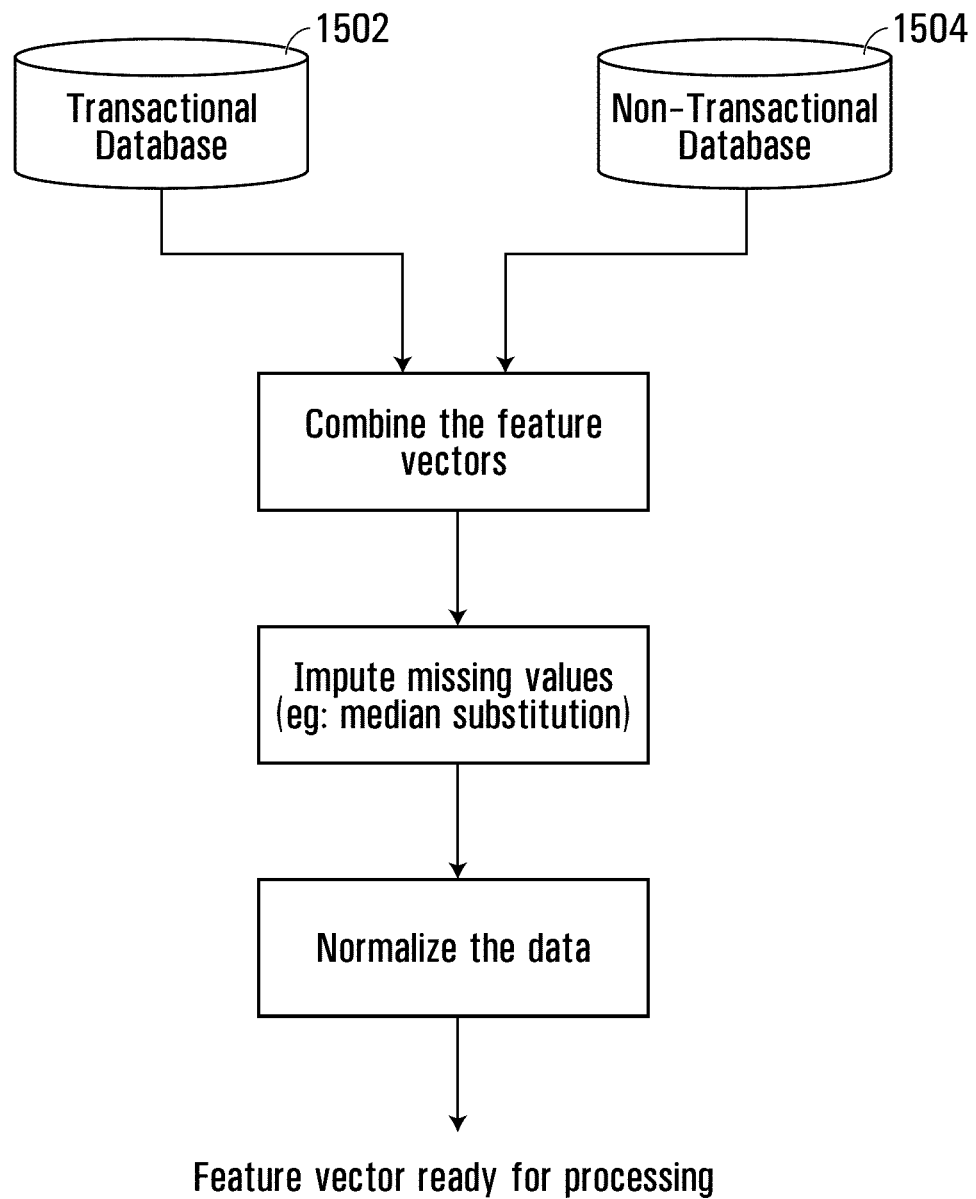
FIG. 19 is a process flow diagram illustrating a sample method for combining information to output a feature vector ready for processing, according to some embodiments.

FIG. 19 is a process flow diagram illustrating a sample method for combining information to output a feature vector ready for processing, according to some embodiments. In FIG. 19, there may be different data stores including a transactional database 1502 and a non-transactional database 1504. The embeddings from each of these databases is combined to generate feature vectors, and where information is missing, one or more additional transformations may be made to impute missing values (e.g., by median substitution). Data is then normalized, and an updated feature vector is available for use.

All data in the vector needs to be pre-processed. There will frequently be missing values. For example: A user age or income may be unknown. Typical Machine learning techniques do not work well with missing data.

Hence, this data needs to be extrapolated from existing data. Methods for imputing data are used in the case of missing data such as taking the mean, median or mode (for numerical data) or taking the most common value (such as categorical) data. For example if Income values are 12000, 15000, 17000, 17000, and 40000 the value for a user who is missing income data is taken as the median (17000).

In a technical example, registration for a new user is completed on a mobile-device such as a smart-phone, the mobile-device application is used to perform several transactions. transaction data and details are sent to the primary server which then sends them to a data store, and social data such as comment text, story text are sent to the primary server which then sends them to a data store.

The system collects interaction data as the user uses their device, and is stored on a data-base connected to a central server. The server calculates ratings for each user-offer pair and displays the top-N (depending on the device size of the user and user preferences) by sending the offer details over a communication network. The offer details are now displayed on the device.

Figure 20:
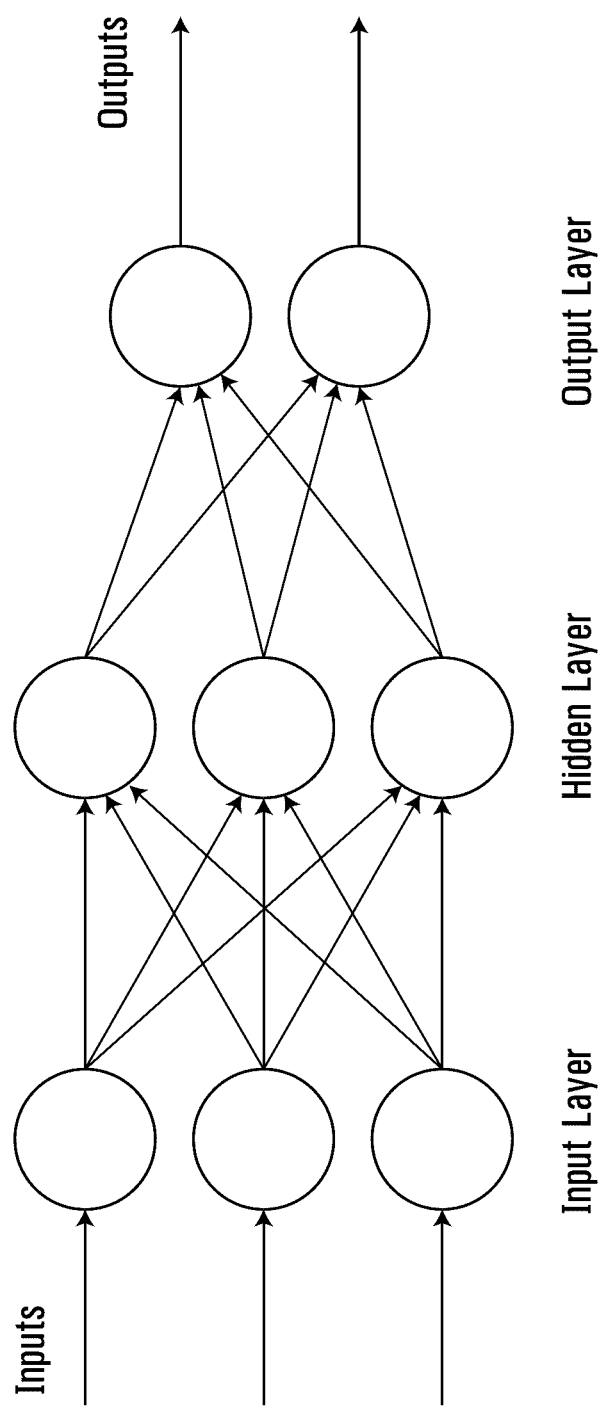
FIG. 20 is a schematic rendering of a sample neural network having input layer neurons, hidden layer neurons, and output layer neurons, according to some embodiments.

FIG. 20 is a schematic rendering of a sample neural network having input layer neurons, hidden layer neurons, and output layer neurons, according to some embodiments.

Neural networks have achieved strong performance in many types of machine learning problems. Deep learning involves stacking many neural network layers together in order to improve the representational learning capability of the network and hence classification accuracy. One of the advantages of deep neural networks as compared to other data science methods is that it allows for the adding of continuous or discrete data to the model with little or no modification.

Convolutional networks have achieved strong performance in image recognition. They involve several types of layers, ranging from convolutional layers, drop-out layers and max-pooling and average pooling layers.

The system takes advantage of convolutional neural networks in order to classify images encountered during use; for example, images in user stories and retailer offers. The system uses a pre-trained network, that has been trained to perform large-scale class identification. It is then trained on images of the most frequently bought items such as shoes, coffee, groceries, clothes etc. This reduces the training time from many months to less than a day.

LSTM (long short term-memory) networks are a type of neural network designed to remember and apply context over sequences. For example, in a document that contains a description of a product, the network is able to remember important details of the offer that are present in the beginning of the text (such as designer name) even when parsing the end of the text that does not mention these contextual properties explicitly. These networks have strong performance in text comprehension. LSTM networks are ideal for sentiment analysis, as they are suitable at remembering the sentimental context of a large text file, this ability to remember is implemented via recurrent connection in artificial neurons.

Where the system is newly starting up, it may encounter "cold start" data problems. For example, since financial data and offer redemption data (which may be considered as the primary input data are not available, the system suffers from the 'cold-start' problem of recommender systems.

In these cases, goal information is collected on registration and social data is imported into the system from various popular social networks such as Twitter or Facebook. This helps enable accurate recommendations to be served to new users of the system. The system extracts features from goals such as duration, amount to be saved, currency to be saved in, the embedding of the goal text (e.g., 'Two week vacation in the Bahamas').

Figure 21:
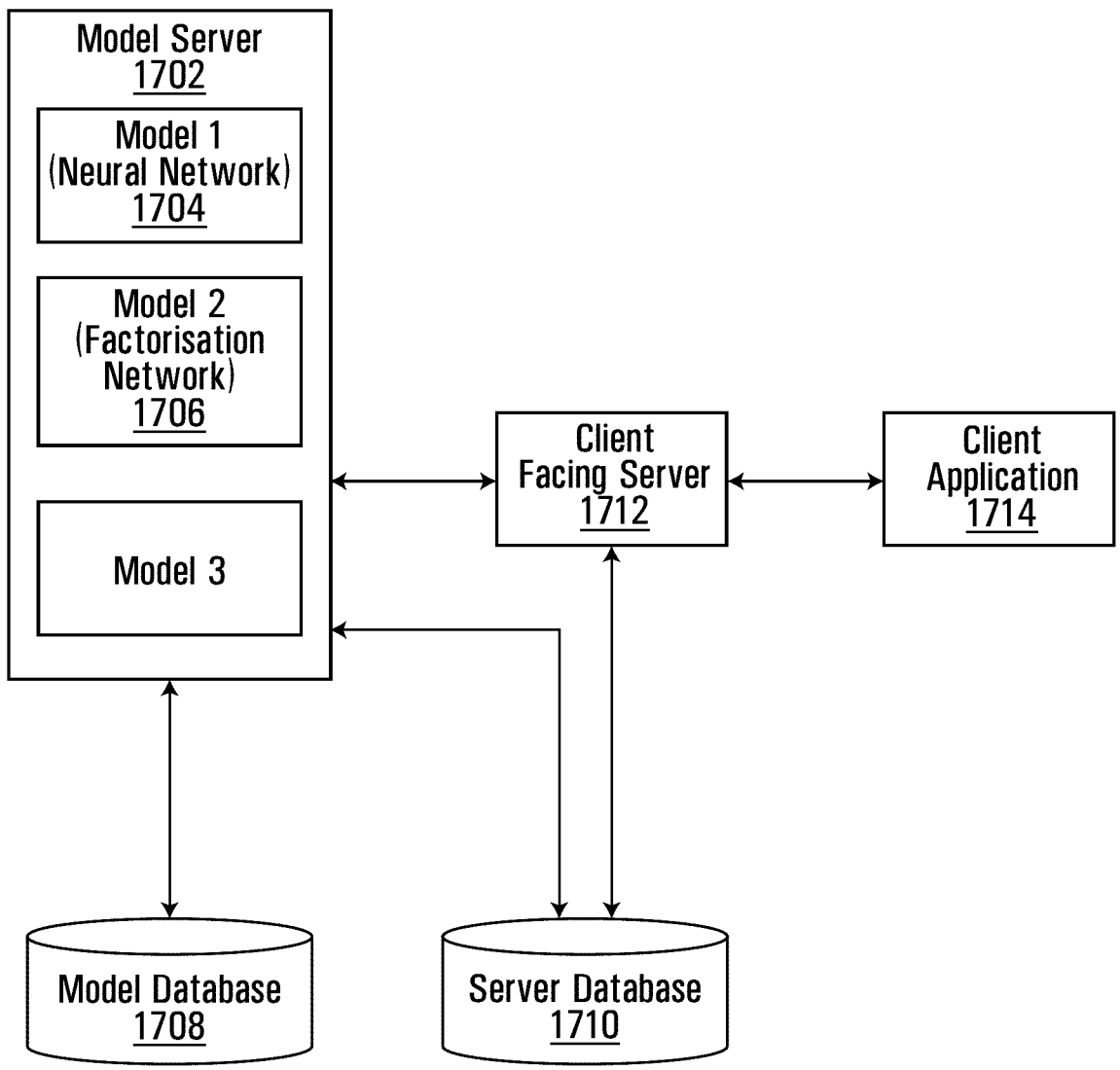
FIG. 21 is a block schematic illustrating a neural network modelling server, according to some embodiments.

FIG. 21 is a block schematic illustrating a neural network modelling server, according to some embodiments.

A model server 1702 is provided that provides neural networking and factorization network capabilities. The neural networking may be provided by a first model server 1704 and the factorization network may be provided by a second model server 1706. The models may be saved on model database 1708, which are used to process the feature vectors stored on server database 1710, for provisioning to the client facing server 1712 for consumption by client application 1714. The neural network 1704 may, for example, be used as a redemption predictor neural network, processing the aggregated multi-dimensional vector for various users.

Model 3 may be a neural network or factorization machine or something else entirely. It is another trained model differing either in architecture or algorithm or both. The inputs and outputs for each model would be feature vectors (the user feature vector and product vectors) and the output would be a prediction (redemption or no redemption).

The model database stores parameters for each model, and can be considered as holding a snapshot of a model which allows us to quickly reconstruct the model. The point of machine learning could be viewed as a method to learn parameters which can be applied to the input to get a prediction. Those numbers (parameters) are stored in the database.

The redemption predictor neural network 1704 is configured for training over a period of time using user multi-dimensional vectors by generating predictions (e.g., by way of one or more distances or other patterns determined in relation to various dimensions of the multi-dimensional vectors). These are utilized to generate more accurate purchase recommendations as predictions are trained against real-world behavior.

The redemption predictor neural network 1704 is an electronic network of "neurons" as noted in FIG. 20, which process records to establish classifications and identify patterns in data. The redemption predictor neural network 1704 may include multiple layers, and neurons may be configured to have different characteristics, such as different speeds of weight modification, memory features (e.g., having past occurrences impact a transfer function), among others.

As the dimensionality of the underlying data increases, the neural network tracks a significantly large number of relationships as there may be relationships between each dimension pair (or other types of linkages) and the relationships tracked by neural networks may, for example, exponentially increase, and dimensionality reduction techniques may be required to reduce complexity to a practical level for generating predictions within a reasonable timeframe.

Predictions, for example, may be whether a user, if targeted with an offer or a reward, will redeem the reward. The redemption behavior can be tracked using cookies or other means and provided back to the neural network to update neurons in the form of training.

Factorization machines through factorization network 1706 are used to produced recommendations on sparse data which is the case for recommender systems, in an extremely efficient (linear) manner. They are capable of modeling interactions between different objects such as users, offers, and context variables due to the fact that they work well on high-dimensional categorical data. The data in the feature vector records most interactions between entities (users, comments, stories, transactions, etc.).

They can be trained in linear time which is extremely efficient from a production environment stand-point. Since the parameter 'k' is often much less than the number of features in a feature vector (in our case hundreds or thousands of vectors for a User feature vector), it prevents the system from learning from non-existent interactions between features as 'k' acts a restrictor of representational complexity. It stops the system from over-fitting in the case of sparse data. In situations where dense interactions data between all features is available (there are no high-dimensional categorical data), using a technique better suited for dense interaction data such as SVM (support vector machines) or a deep neural network may be required.

To take a simplified example of a User feature vector take a vector (0, 0, 1, 0, 0 . . . ). A vector full of zeroes except a single one is present to indicate the current user, in this case user 3. For example, a extremely simplified offer vector (1,0,0,0) can be provided which similarly indicates item 1. Since the system may have many thousands of users and several hundred offers, the size of these vectors in very large and hence the vectors are extremely sparse. Modeling an interaction between user number x and offer number y may have no basis in the data as the interaction is likely to simply not exist. A Support Vector Machine (SVM) would attempt to model interaction parameters between all features and would likely (a) overfit and (b) take more than linear time.

As a result, it is of very high dimension. The data is also extremely sparse, as most entities do not interact with each other. Factorization machines 1706 are particularly well-suited for modeling interactions on this sort of data and are extremely fast (linear) as compared to non-linear methods such as support vectors machines.

The equation for a factorization machine of degree 2, where only interactions between pairs of features are considered, is given by:

$$\hat{y}(x) = w_0 + \sum_{i=1}^{n} w_i x_i + \sum_{i=1}^{n} \sum_{j=i-1}^{n} <v_i v_j> x_i x_j$$

Where ŷ is the predicted output. is the input feature vector. $X_i$ represents feature i in the feature vector. $W \in \Re^n$ and $V \in \Re^{n*k}$ are the learned parameters of the system. n is the length of the feature vector. k is the chosen low-rank dimensionality of the interactions between features (ii n).

In some embodiments, one or more of the machine learning approaches involve the intermediate step of determining latent variables for each of user, reward, action or goal. Latent variables are a reduced size vector representation of feature interaction which are learned from the data during training. To take an example of matching a user to stores that sell beverages, the dot product of the latent variables that correspond to the consumption of beverage and the vector variable of a beverage shop would be determined to be a high value if the user is a heavy consumer of beverages.

Although, in theory, deep neural networks and factorization machines can reduce or eliminate manual feature engineering, in practice in all these systems a large amount of engineering effort is devoted to feature engineering. For this reason, the system has several modules which reside on different computers/virtual machines which may be chosen to serve the final list of recommendations depending on recent performance metrics. The model servers chooses which model to serve based on factors such as time to serve and historical accuracy.

Figure 22:
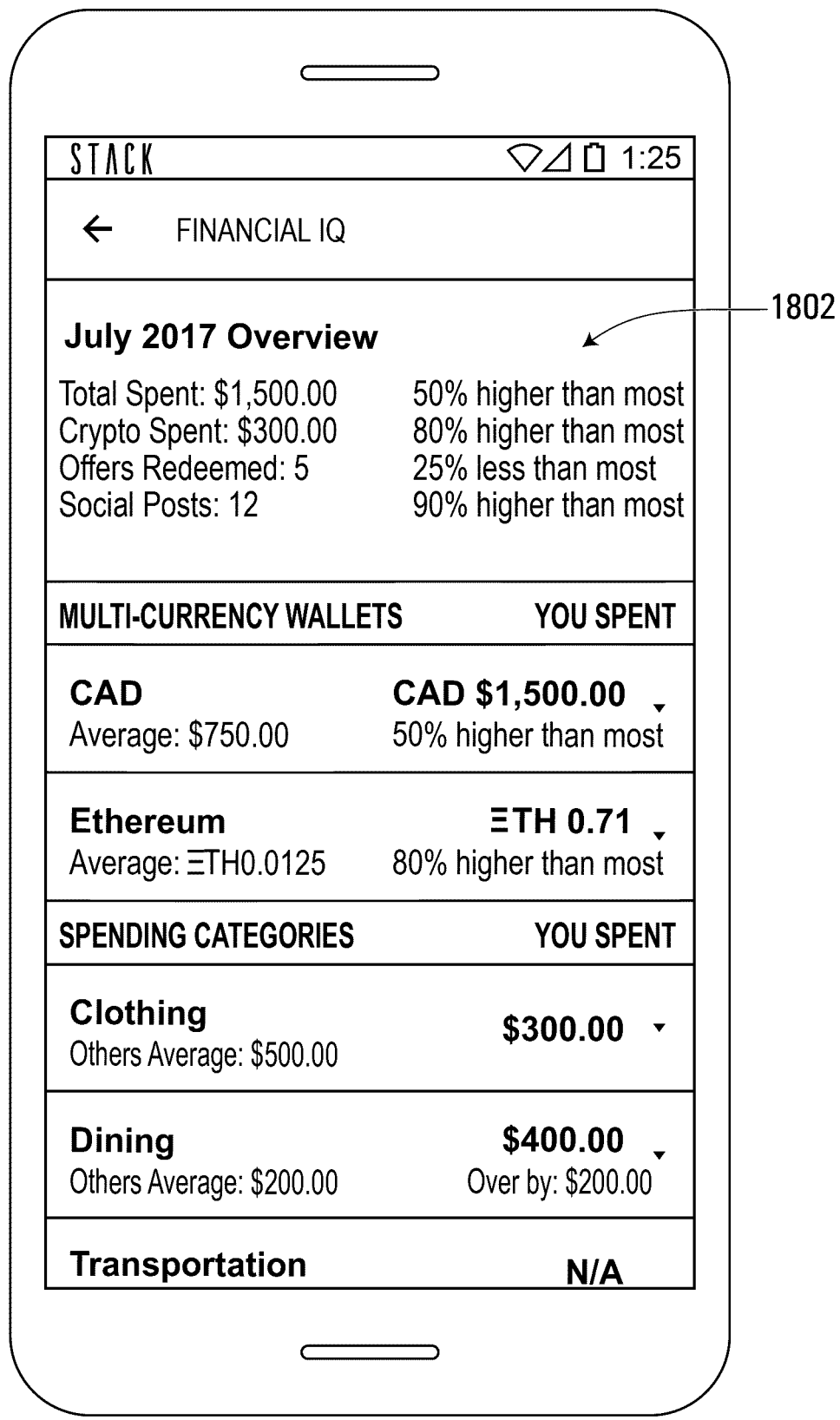
FIG. 22 is a screen depiction provided on a display of a device controlled to render visual elements of a mobile application, the screen depiction including a rendering of a user's transaction list compared against a population cohort, according to some embodiments.

FIG. 22 is a screen depiction provided on a display of a device controlled to render visual elements of a mobile application, the screen depiction including a rendering of a user's transaction list 1802 compared against a population cohort, according to some embodiments.

Figure 23:
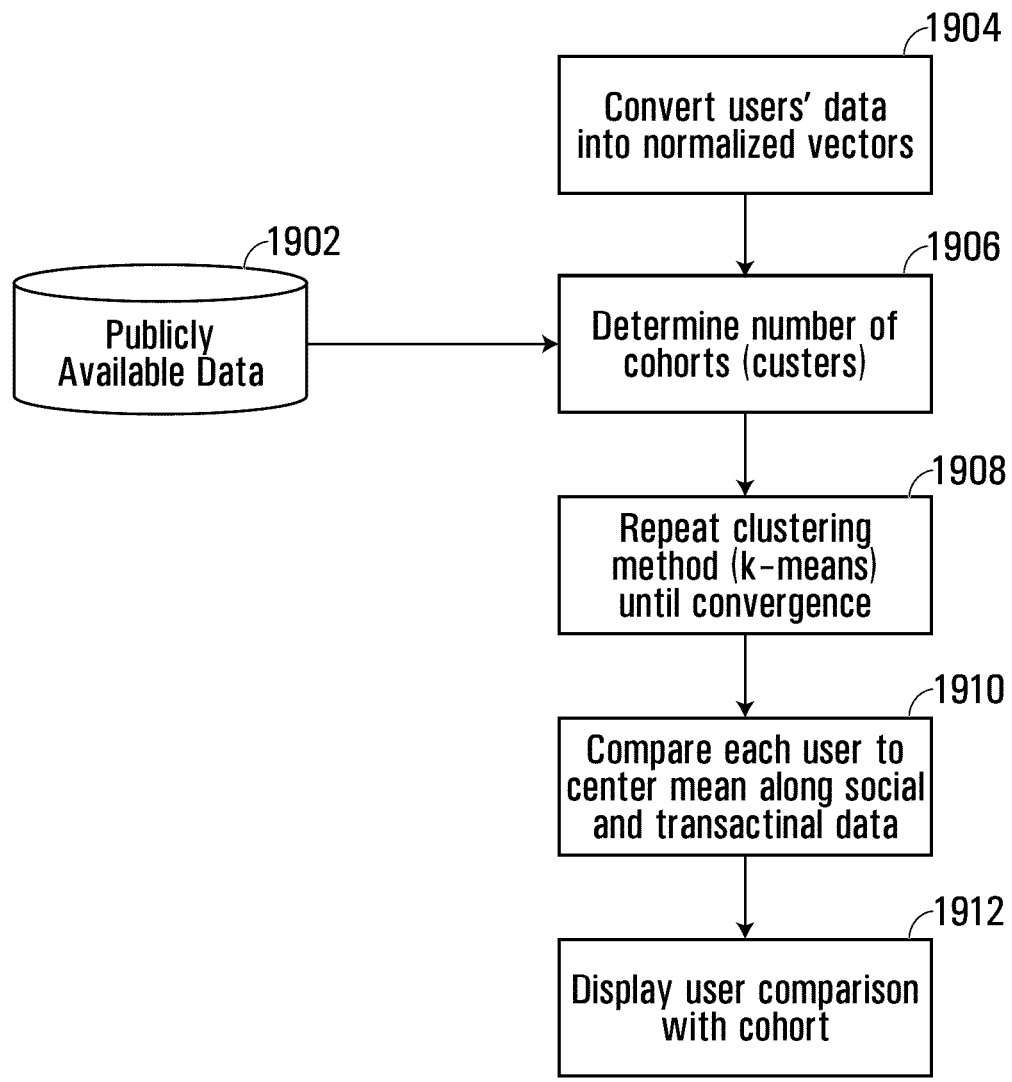
FIG. 23 is a method diagram illustrative of a sample method for identifying clustering and cohorts, according to some embodiments.

FIG. 23 is a method diagram illustrative of a sample method for identifying clustering and cohorts, according to some embodiments. Publicly available data at 1902 is applied to normalized vectors at 1904 to determine a number of cohorts at 1906. Clustering methods are repeated until the clusters converge at 1908, and comparisons are made to associate a user with a cohort at 1910, and the user comparison is displayed alongside a cohort at 1912.

The primary server 108 defines a user's socioeconomic spending habits as the pattern of purchases made over time along a set of categories, taken in relation to other members in his or her socioeconomic status. The primary server 108 compares these patterns to the user's cohort, which is defined as a group of people who are similar in income, cost of living, standard of living, social media activity, spending activity, crypto-currency, and other circumstantial attributes relevant to their socioeconomic success. It is an objective of the system to help users reach their life milestones through improved financial literacy. First, the primary server 108 establishes a database in which it stores aggregate user purchase/transaction data, segmented by member cohorts.

Cohorts are determined by a combination of factors, which may include income bracket, demographic information, and other information collected about a member over the span of their membership. Members are indexed against the database later in the process. The database may be divided into discrete buckets or a continuous range along any number of variables.

The database is initially populated with demographic data obtained from sources including but not limited to publicly available datasets. Once the database is initialized and put into production, it is populated with member transactions in near real time. Each member is indexed based on a combination of features including but not limited to their financial background, social activity and crypto-currency spending, whether divulged directly or inferred from available data sources.

The primary server 108 collects member payment records from transactions from the payment processor when members move money in and out of their account to make purchases, transfer money to others, or conduct other financial activities that the server may gather. Payment records include but are not limited to purchase records and transfer records. The server defines purchase records as a record of the address and time of the purchase, the name and type of the vendor, amount spent, and the category or type of purchase, such as electronics, groceries, or clothing.

Transfer records include money being added to an account, or being withdrawn or moved out of the account. These records include the source of the funds and the destination. The server stores these records in a database of the member's spending history. On every transaction event, the primary server 108 may compare the pattern of spending behavior with the aggregate cohort.

The determination of cohorts is by the use of a distance measure which may taken as one of many common distance measures such as the Euclidean, Manhattan, Mahalanobis and any other distance measure for estimating the distance of a point to the mean of a dataset.

The primary server 108 adds each recorded payment to the database, and used it in future comparisons. As such, the database is constantly kept up to date. The primary server 108 provides useful information to the member about their spending habits compared to their cohort. The system may suggest specific improvements to their habits, point out anomalies, and help align them with the best spenders in their cohort. The primary server 108 may render this as a graphic, a description, or an interactive process, for example, as part of a digital representation of a digital story rendering spending data of one or more users in one or more several categories and one or more spending modes. The digital story is a time-based record of the user's spending behavior and/or social media postings, and can include cryptocurrency transactions and/or records.

Figure 24:
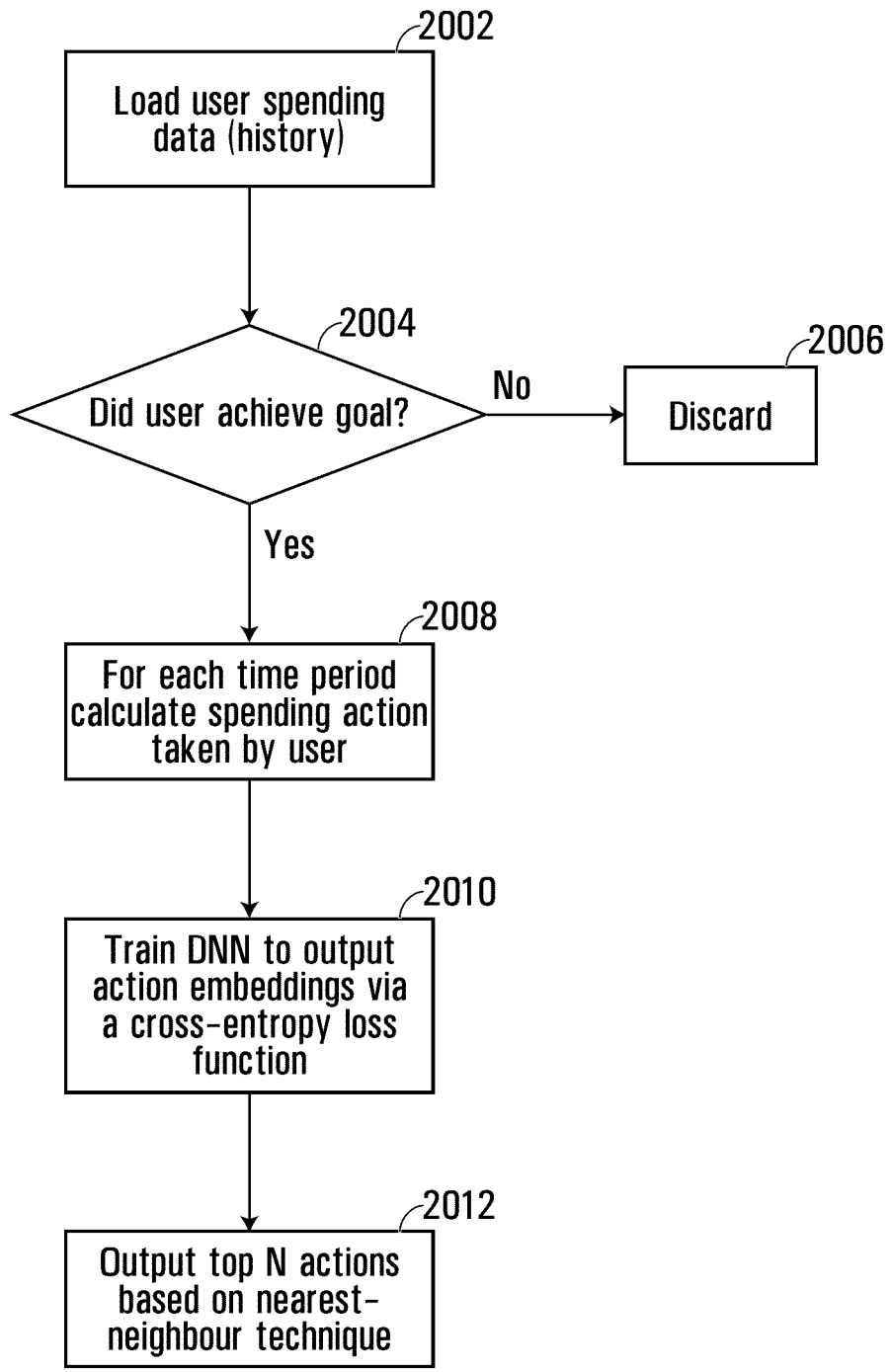
FIG. 24 is a process flow diagram illustrating a sample method for tracking goal achievements, according to some embodiments.

FIG. 24 is a process flow diagram illustrating a sample method for tracking goal achievements, according to some embodiments. Goals are tracked against loaded spending history at 2002, and where a user achieves a goal at 2004 (the method does not continue if the goal is not achieved at 2006), spending actions are tracked at 2008, and cross-entropy loss functions are used at 2010 to establish a top N set of actions based on a nearest neighbor technique at 2012.

An action vector is a representation of an action including a learned embedding of the action text ('saved 5% percent on clothing'). For example for the action 'save 5% on clothing', assume the learned vector for clothing is '1,0,0, 0,1,1', the actions vector may be (5,1,0,0,0,1,1) which may be further normalized and added to. The goal vector is a combination of goal related data such as amount, duration, location and a embedding of the learned goal. For example, the goal 'save 10000 for a vacation in the Bahamas in the next two months' could have a goal vector of The goal vector may be (10,000,60(time duration),location embedding(bahamas), embedding(goalText)). The user feature vector also contains an aggregate of all current goals of the user.

To learn user histories in time, the system of some embodiments periodically determines an action history for each user. For example a 3 month period divided into month long time-steps, the history might look like {save 2% on clothes, save 3 on internet, spend 5% less on electricity} which is calculated on a per month or any other time period basis after classifying all user spending in categories.

For training, the actions are fed along-side the user feature vector at the time-step immediately preceding the time the action was taken. The process of calculating the user feature vector during each time-step instead of the latest user vector for all action predictions generates more accurate next actions as the training stage does not use 'future' data relative to the action.

To take a technical example suppose a user has a current goal to save 1000 for college, To take an extremely simplified user feature vector of a user who is 19 years old, makes 20000 dollars a year and whose average purchase is a 10$ drink of coffee at the local coffee shop (example embedding is 1,0,0,01 after creating embedding for each merchant) and has a spending amount per month of 100$. The simplified example vector is {24,20000,100,10 1,0,0,01}. Suppose the action 'reduce coffee expenses by 5%' which is encoded by {0,1,0} Suppose the average similar users who completed goals in the past were achieved them by reducing spending on coffee, other user vector will exist such as 45 year old earning 100000 a year who is similar to people who reduced spending on automotive expenses by 15%. The model will learn to recommend actions suitable to the particular user vector i.e., reduce spending on coffee as opposed to reduce spending on automotives. Relevancy of actions is estimated using the various user feature vectors, and provides an improved feature of accuracy based on automatically generated estimations tracked from aggregated extracts of user behavior. A measure of relevance, for example, may be a Euclidean distance in n-space (e.g., a threshold maximum distance, or weighting based on the distance).

There are several embodiments of the method of providing financial insights to users based on goals: The first method involves training a neural network on the actions taken by users who achieved goals. The user's features and goal features are passed to the network in addition to publicly available information such as external economic factors such as inflation rate and GDP growth.

This data is available via an Application programming interface on repositories such as www.statbureau.org from a device connected to the public internet. The system first learns a number of actions from the spending vectors of user histories. The actions are in the form of a spending change (ex. spend 5% less on groceries, spend 20% less on clothing) over a time period (ex. week, month, till goal time period').

Figure 25:
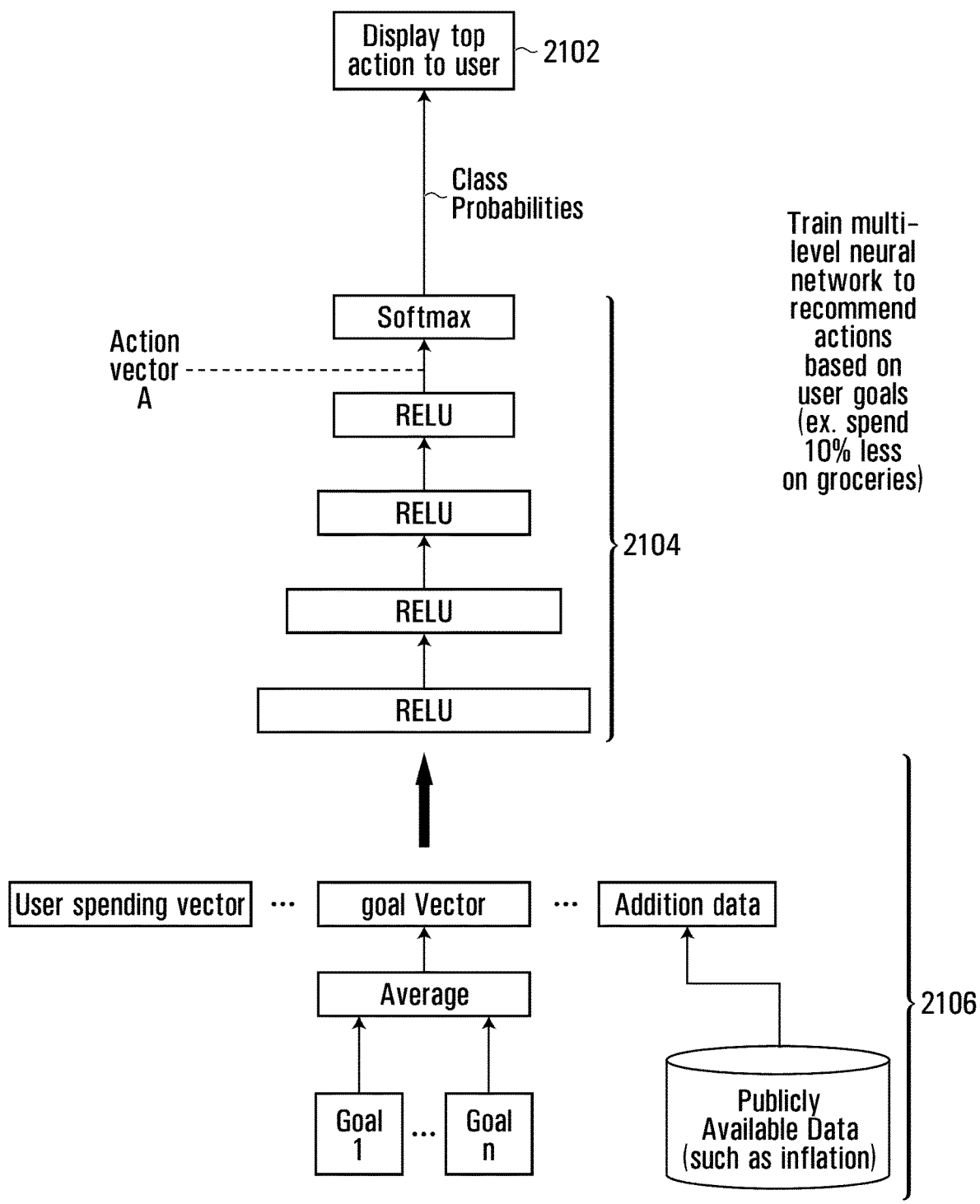
FIG. 25 is a process flow diagram illustrating a sample method for recommending actions for users based on user goals, according to some embodiments.

FIG. 25 is a process flow diagram illustrating a sample method for recommending actions for users based on user goals, according to some embodiments. The process flow includes training a multi-level neural network to recommend actions based on user goals. Given data sets representative of a history of prior user actions that led to achieving a goal (e.g., by way of the user feature vectors), the neural network is trained with a prior user's then 'current state' and next action.

The use of recommending next action gives an immediate action point for a user based on proven results instead of current systems which recommend multiple actions at once (cut cable, stop eating out) at once based on an ideal budget, which may be overwhelming for a user. The actions recommended by the system can, in some embodiments, be based off of the actual prior actions that led to achievement of goals by other users, and combinations thereof. Additional RELU layers are included for the network to be able to model complex interactions between features. More layers aid in machine learning.

Figure 26:
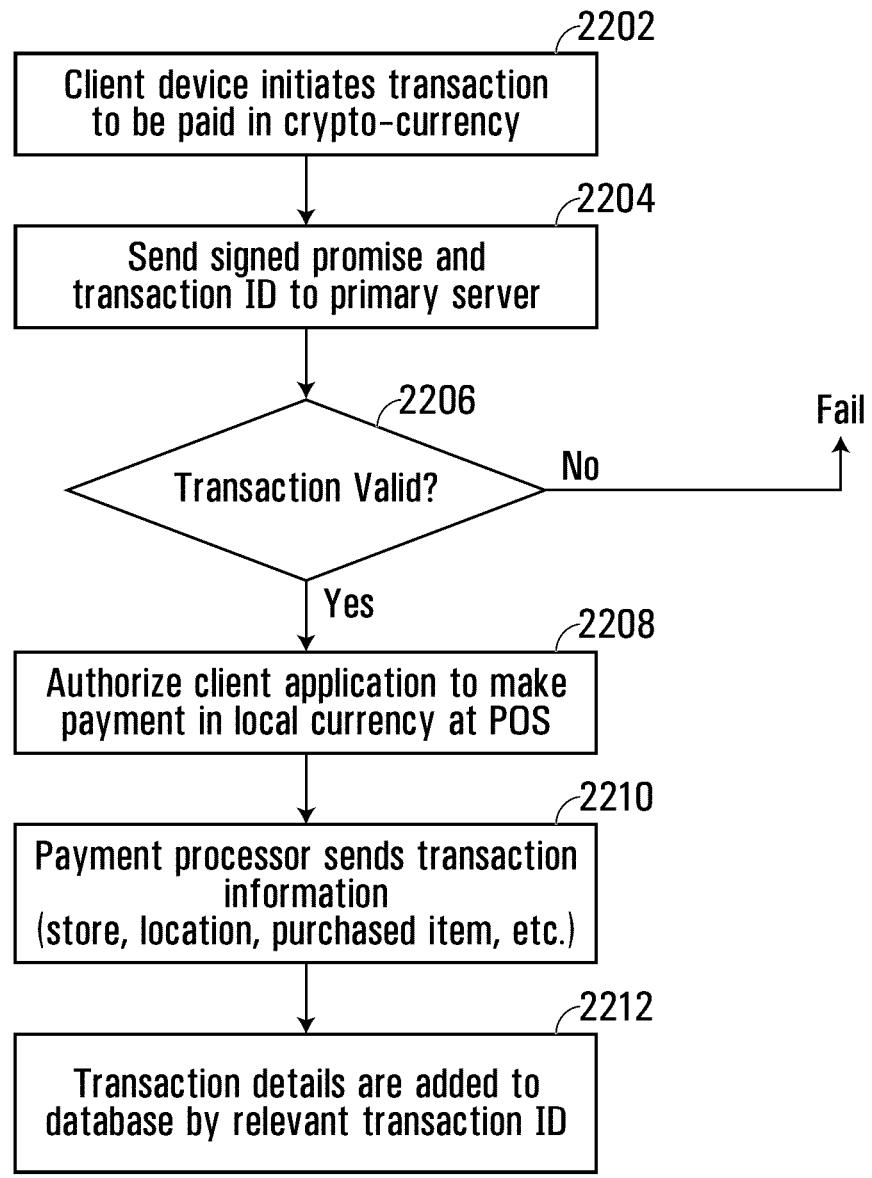
FIG. 26 is process flow diagram illustrating a sample method for tracking signed promises to enable cryptocurrency payments at a point of sale terminal, according to some embodiments.

FIG. 26 is process flow diagram illustrating a sample method for tracking signed promises to enable cryptocurrency payments at a point of sale terminal, according to some embodiments. A cryptocurrency transaction is described from steps 2202-2212, where a client devices initiates a transaction at 2202, and provides a signed promise and transaction ID to the primary server 108 at 2204. The transaction is validated at 2206, and where the transaction is validated, an authorization is made to transact at the point of sale in local currency at 2208. Transaction information is provided to the primary server 108 at 2210, and the details are added to the database at 2212.

The transaction itself can be linked to a crypto-currency social story. Social stories are explicitly linked to transactions, giving a direct source of information about that transaction. Current implementations of recommender engines do not have access to users' transactional data, let alone access to the crypto-currency purchases of users. This is frequently preferred by users of crypto-currencies who enjoy anonymity when they transact. However, for users that prefer to make public cryptographic purchases using the digital financial services platform of the patent, such data as obtained is used to support recommendations. This use of data is not accessible to current recommender systems.

The source of the crypto-currency information is a publicly accessible block-chain node which is a computer server connected to other servers according to a specific block-chain.

---

Algorithm 5 Calculate crypto-currency data features and score for a user U: extractCryptoCurrencyFeatures( )

cryptoVector ← [ϕ]
cryptoRatio ← amountSpendNotUsingCrpyto/amountSpentUsingCrpyto
append(cryptoVector.cryptoRatio)
append(cryptoVector.NumberOfCryptoTransactions(U))
append(cryptoVector.AverageAmountOfCryptoTransactions(U))
append(cryptoVector.AverageTransactionFee(U))
append(cryptoVector.AverageBlockConfirmationTime(U))
append(cryptoVector.MedianAmountOfCryptoTransactions(U))
append(cryptoVector.MedianTransactionFee(U))
append(cryptoVector.MedianBlockConfirmationTime(U))
append(cryptoVector.standardDeviationOfAmountOfCryptoTransactions-(U))
append(cryptoVector.standardDeviationOfTransactionFee(U))
append(cryptoVector.standardDeviationOfBlockConformationTime(U))
return cryptoVector

---

Examples of cryptocurrencies that use blockchains include the Ethereum and Bitcoin. The node may be part of this system or operated by an external entity. The node regularly feeds the system data about the current state of the blockchain (on a per-block interval or any other suitable interval).

A typical block interval for Ethereum is 12 seconds while for Bitcoin it is around 10 minutes. The node is set to a sampling rate based on the known approximate block times of the block-chain that it is monitoring. The computer servers accesses the node via a communication network. The raw transaction data is calculated on a per-user basis as shown in the pseudo-code for calculating crypto-currency features.

Using the processes described above to attain SKU-level data for purchases denominated in fiat currencies the system is able to attach SKU-level data to purchases made using crypto-currencies.

Figure 27:
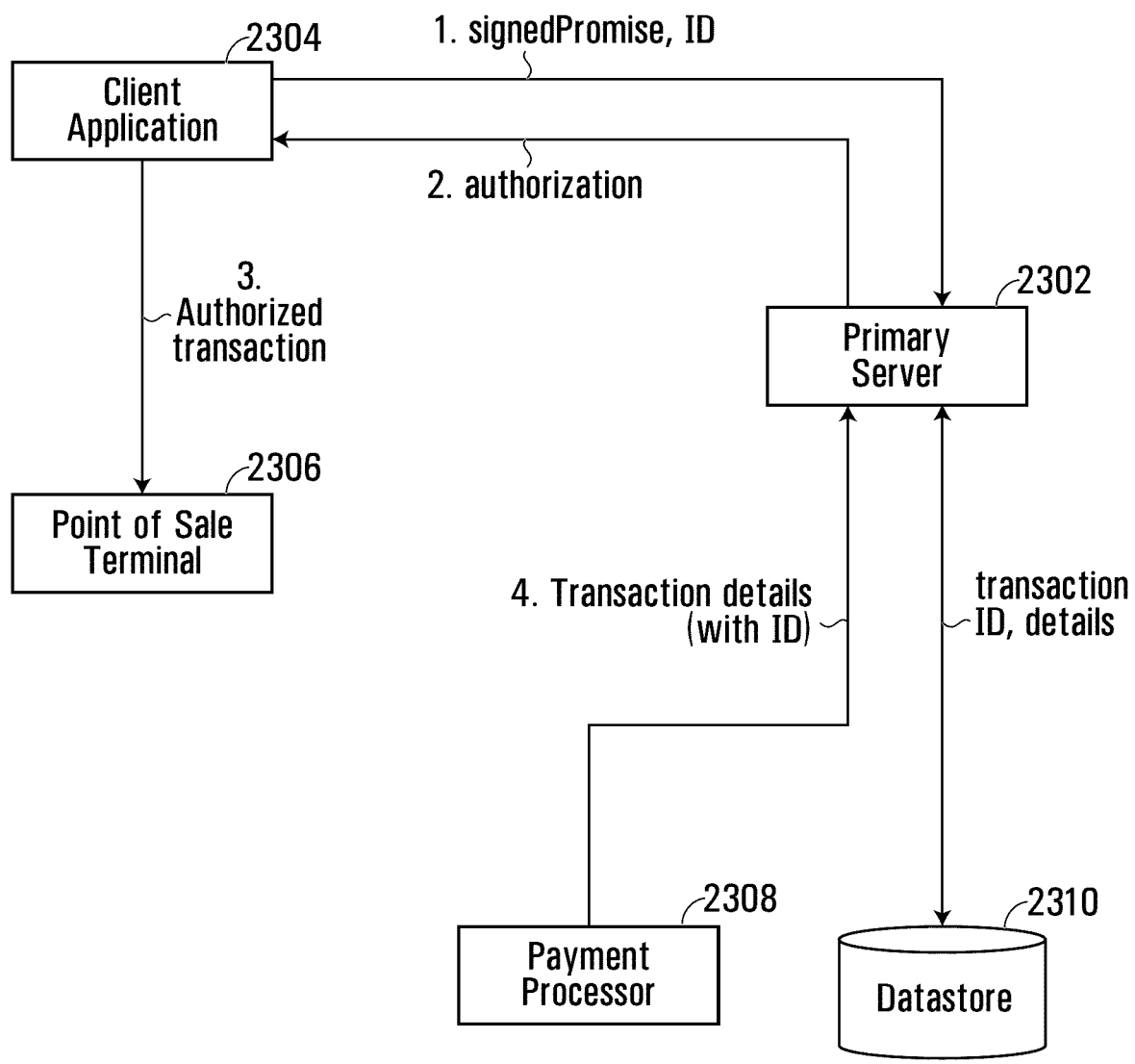
FIG. 27 is block schematic diagram illustrating a sample method for tracking signed promises to enable cryptocurrency payments at a point of sale terminal, according to some embodiments.

FIG. 27 is block schematic diagram illustrating a sample method for tracking signed promises to enable cryptocurrency payments at a point of sale terminal, according to some embodiments.

Transactions on most crypto-currency protocols are pseudo-anonymous with public addresses that are derived as the receiving and sending parties. This makes it difficult to determine exactly what was bought, by whom and to whom the transaction was made.

To associate a transaction-id with each unique purchase allows associating the item bought with the crypto-currency transfer. When a client attempts to pay at a point of sale terminal using crypto-currency a transaction id is passed to the primary server over a communication network. This introduces a need for efficient transmission of data over the network as the point of sale terminal time-outs in a matter of seconds.

The client application sends a signed promise (in the form of a signed crypto-currency transaction/data payload) and transaction id which together should not be more than 100 bytes be signed using a hashing algorithm for example (keccak256, sha3 or any other NIST hashing protocol) together with a key to pay the crypto-currency balance to the primary server. The server has a dedicated service on standby to rapidly validate the transaction and send back and authorize the client application to make payment in the point of sale's currency. The primary server also saves the transaction id. After the payment has gone through the payment processor sends transaction details to the primary server with a transaction id.

To store transaction information in an encrypted form on the blockchain, the blockchain node periodically stores the encrypted transaction id on the block chain inside a data structure known as a Bloom filter whereby, any entity can check if a certain transaction exists on the blockchain by checking presence of the encrypted transaction hash in the Bloom filter. The Bloom filter information and extracts thereof, in some embodiments, is stored as a representation, modified over time, as a dimension the user feature vector.

The above method serves as a proof of existence for transactions to retailers and merchants since each block is timestamped, the retailer can verify the existence of a transaction. This allows for after the fact distribution of discounts, rewards and cash-backs or other incentives by retailers after a crypto-currency purchase.

Figure 28:
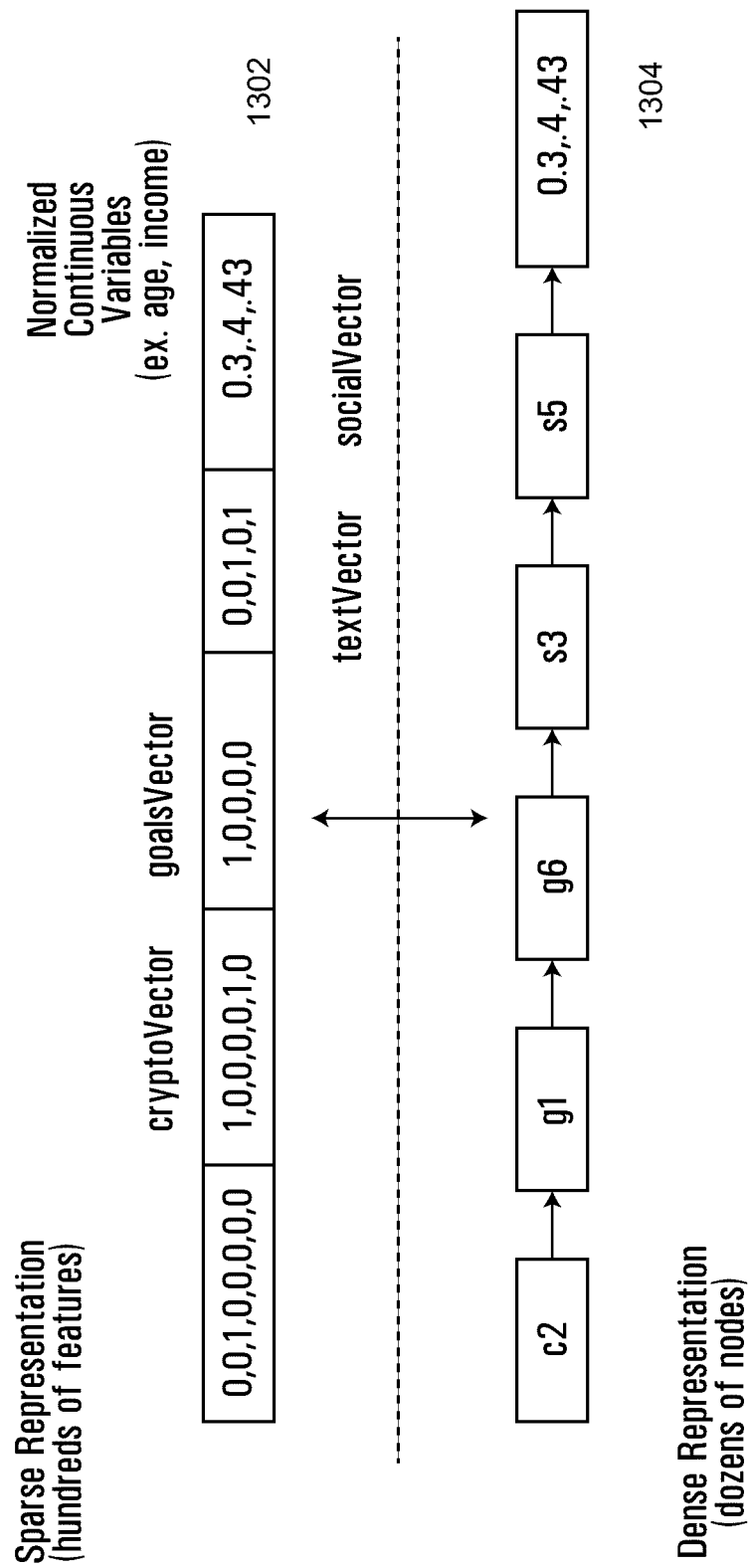
FIG. 28 is a data structure diagram illustrating a sample segmentation of a data structure, stored as a sparse representation, or as a dense representation, according to some embodiments.

FIG. 28 is a data structure diagram illustrating a sample segmentation of a data structure, stored as a sparse representation 1302, or as a dense representation 1304, according to some embodiments. The sparse representation 1302 for example, can be a sparse data structure where array elements each have their own memory locations and allocated memory. Such a data structure may be quick to access, but may not be particularly memory efficient.

On the other hand, a dense representation may be possible whereby linked lists of nodes are linked to one another such that retrieval may require traversing more than one memory location to access pointers to a next memory location. However, an advantage of a dense representation is that much less memory usage is required. For example, only memory may need to be stored for dozens of nodes, as opposed to hundreds or thousands.

However, as the neural networks may require fixed-length representations (better suited by the sparse representation), accessing the dense representations 1304 may require a first transformation to the sparse representation 1302, or storage in an intermediate data structure. Given the large number of potential array elements, this could be a time consuming process.

The use of a high number of dimensions (e.g., requiring a large amount of memory) increases the speed at which training may occur (in terms of accuracy reached in a number of iterations). Additional dimensions may be established that are derivatives or transformations of underlying dimensions associated with raw data, the additional dimensions storing, for example, may include non-linear transformations or combinations of other dimensions. The additional dimensions aid in neural network processing especially where non-linear relationships are suspected or present, as the number of training cycles required to adapt for non-linear relationships is drastically reduced.

However, including additional dimensions compounds the technical problem associated with memory usage. Due to the constraints of neural network processing requiring fairly fixed-length vectors, each additional dimension adds at least an additional memory requirement across all multi-dimensional vectors (if dense representation techniques are not utilized).

Since a majority of users do not interact with other entities such as rewards, other users and social stories, it is redundant to store most of the users interaction data because it is sparse (for example mostly begin a list filled with all zero's from i to j to indicate no interaction with the items assigned indexes i to j). Storage can be reduced significantly by storing the interactions of "non-social" users as a dense representation such as a series of linked list nodes. It is however computationally expensive to convert the dense vector 1304 to a sparse vector 1302 which is suitable to be fed as the input to a technique such as a deep neural network as all interactions must then be explicitly filled with a null marker (such as a zero or highly negative value).

For example, assume 80% of users have 20% of the activity, the sparse vector for their social interactions is stored as a dense linked list of nodes 1304. However a certain percentage of users are highly connected, and it is computationally expensive to transform dense linked nodes 1304 to a sparse representation 1302.

As a balance to maximize both storage and reduce computational complexity the data contains most user feature vectors in the form of the dense representation, with only highly-active users' features being stored in a sparse representation.

These properties can be modelled based on tracked social interactions, using an "outdegree" and an "indegree" determination that is computationally extracted from the tracked social interaction data.

For example, the outdegree is determined based on the number of stories, comments and other social interaction made by the user. It is a measure of the users activity. The indegree is the number of users who have posted a comment or story or any other social linkage to a user.

Both of these properties can be modeled as having a power-law distribution. In this example, both the indegree and outdegree of a user are required to have a low probability value (most users have a lower indegree and outdegree) in order to classify a user as social.

An example of determining if a user is social or non-social is given below. The system processes all users and calculates the outdegree and indegree of each user.

It then attempts to fit a power-law curve to the data (separately for out-degree and indegree). Assume that the a for both parameters is 2. The complementary cumulative distribution function can now be given as $P(x)=(x/x_{min})-\alpha-1$. Taking $x_{min}$ as 1 and a as 2. as example network parameters. If a user has 10 comments+stories, their outdegree is 10. The probability of a user having more than 10 posts is $(10)^{-2+1}$ which is 10%. A similar calculation can be done for indegree. The system classifies users as social if the probability of both outdegree and the degree of the user is below a certain threshold.

For example, setting 10% as the threshold for the current example requires an indegree and outdegree of more than 10 each. This prevents a user with a very high out-degree (possibly a spammer) from being classified as a social user if other users are not interacting with it. Outdegrees are determined based on all the interactions that a user has done on the system. Indegrees are determined by number of users who interacted with a user. These are tracked by the system and maintained, for example, in at least one of the dimensions of the multi-dimensional user feature vectors. The determination of outdegrees and indegrees may be modified by relevancy or currency of tracked interactions (e.g., a count may be established that may be limited based on parameters, such as within the past 6 months, etc.). Weighting factors may be used, in some embodiments.

Each multi-dimensional vector 1302 is represented in an array (e.g., a single dimensional series of pointers) of a plurality of array elements, and each array element of the plurality of array elements represents a different dimension of the multi-dimensional vector, the array elements, in combination, representing the approximation of the user's behavior in the n-dimensional space.

Each array element of the plurality of array elements is a pointer to a memory location storing a numerical variable representative of a corresponding characteristic of the user. The processor is configured to allocate (e.g., determine contiguous memory locations, reserve memory addresses, etc.), for each multi-dimensional vector of the plurality of multi-dimensional vectors, a set of corresponding memory addresses based on the pointer to the memory location of each array element in the array representing the multi-dimensional vector.

The primary server 108 is configured to classify (e.g., set a Boolean flag) one or more multi-dimensional vectors of the plurality of multi-dimensional vectors as less-social multi-dimensional vectors based on a determination that the one or more multi-dimensional vectors each contain a number of non-zero array elements below a threshold value. These less-social multi-dimensional vectors may provide an opportunity to identify memory addresses that can be de-allocated. The processor stores the one or more multi-dimensional vectors classified as less-social multi-dimensional vectors as dense representations 1304 and de-allocates the sets of memory addresses corresponding to the one or more multi-dimensional vectors classified as less-social multi-dimensional vectors as dense representations.

The dense representations 1304 are stored in the form of linked-lists of nodes, each node representing a corresponding non-zero array element, and linked to a next node representing a next non-zero array element unless the node is an end node. The linked-lists of nodes reduce memory space requirements by freeing up space that is otherwise needed for allocation.

The primary server 108, in some examples, is configured to allocate a corresponding memory location for each node to store the corresponding array element and a pointer representing a linkage to a memory address of the memory location of the next node. Responsive to a request to provide a selected multi-dimensional vector for processing by the redemption predictor neural network where the selected multi-dimensional vector is presently stored as a dense representation 1302, the primary server 108 may translate it back to a sparse representation 1304 by allocating a new set of memory addresses to store the array elements of the selected multi-dimensional vector, convert the selected multi-dimensional vector from the dense representation 1302 and store the selected multi-dimensional vector in the new set of allocated memory addresses.

In some examples, the primary server 108 is configured to periodically monitor social activity levels of the one or more multi-dimensional vectors of the plurality of multi-dimensional vectors classified as the less-social multi-dimensional vectors.

The social activity levels may be assessed pursuant to a power-law metric, and used to determine a subset of the less-social multi-dimensional vectors being associated with social activity levels greater than a threshold social activity level (e.g., in accordance with a power-law relationship). This subset of the less-social multi-dimensional vectors is re-classified to remove the less-social classification, and the primary server 108 allocates a new set of memory addresses to store the array elements of the re-classified subset of multi-dimensional vectors; and converts the each multi-dimensional vector of the subset of multi-dimensional vectors from the dense representation 1302 and store multi-dimensional vector of the subset of multi-dimensional vectors in the new set of allocated memory addresses.

Accordingly, less social but highly active vectors can be re-classified to maintain these vectors in a sparse representation, increasing access speed at a cost of memory efficiency.

The embodiments of the devices, systems and methods described herein may be implemented in a combination of both hardware and software.

These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

As can be understood, the examples described above and illustrated are intended to be exemplary only.

What is claimed is:

1. A computer-implemented device for maintaining electronic representations of aggregate user behavior stored as a plurality of multi-dimensional vectors, each multi-dimensional vector corresponding to a user of a plurality of users and representing an approximation of the user's behavior in n-dimensional space, the device comprising at least one processor configured to:

receive, from one or more point of sale devices, transaction information data sets representing purchase transactions of each user of the plurality of users, the transaction information including, for each purchase transaction, at least a user identifier, an approximate location of purchase, a time-stamp, a retailer, and a price;

receive, from one or more harvester applications residing on user computing devices each corresponding to a user of the plurality of users, social media data including at least one of text, video, images, and audio data associated with the transaction information;

estimate, from the social media data, one or more types of product associated with each purchase transaction;

generate, for each purchase transaction, a temporary multi-dimensional vector representing each type of product associated with the purchase transaction, the temporary multi-dimensional vector storing, in separate dimensions of the vector, numerical values extracted from at least the transaction information and the social media data; and update, for each user associated with the purchase transactions, an aggregated multi-dimensional vector generated from a corpus of purchase transactions associated for the user by incorporating the temporary multi-dimensional vector into the aggregated multi-dimensional vector;

wherein the aggregated multi-dimensional vector is adapted for processing by a redemption predictor neural network to identify one or more patterns associated with redemption of one or more electronic offers presented to the plurality of users, the one or more patterns utilized to generate a redemption prediction which is then compared against tracked real-world redemption behavior of the plurality of users to train the redemption predictor neural network;

provision a multi-dimensional vector representative of a reward for redemption, the reward including a pre-defined number of available potential referrals by a selected user;

receive an indication of a request to share the reward with a second user of the plurality of users;

determine one or more vector distances between (i) the aggregated multi-dimensional vector associated with the second user and (ii) at least one of the aggregated multi-dimensional vector associated with the selected user and the multi-dimensional vector representative of the reward for redemption;

responsive to the request, provision the reward for redemption to the second user, and decrement the number of available potential referrals by the selected user by a second pre-defined number, the second pre-defined number determined at least based on the one or more vector distances.

2. The device of claim 1, wherein each aggregated multi-dimensional vector is represented in an array of a plurality of array elements, and each array element of the plurality of array elements represents a different dimension of the aggregated multi-dimensional vector, the array elements, in combination, representing the approximation of the user's behavior in the n-dimensional space.

3. The device of claim 2, wherein each array element of the plurality of array elements is a pointer to a memory location storing a numerical variable representative of a corresponding characteristic of the user.

4. The device of claim 3, wherein the processor is configured to allocate, for each aggregated multi-dimensional vector of the plurality of aggregated multi-dimensional vectors, a set of corresponding memory addresses based on the pointer to the memory location of each array element in the array representing the multi-dimensional vector.

5. The device of claim 4, wherein the at least one processor is configured to:

classify one or more aggregated multi-dimensional vectors of the plurality of aggregated multi-dimensional vectors as less-social multi-dimensional vectors based on a determination that the one or more aggregated multi-dimensional vectors each contain a number of non-zero array elements below a threshold value;

store the one or more aggregated multi-dimensional vectors classified as less-social multi-dimensional vectors as dense representations; and de-allocate the sets of memory addresses corresponding to the one or more aggregated multi-dimensional vectors classified as less-social multi-dimensional vectors as dense representations.

6. The device of claim 5, wherein the dense representations are stored in the form of linked-lists of nodes, each node representing a corresponding non-zero array element, and linked to a next node representing a next non-zero array element unless the node is an end node.

7. The device of claim 6, wherein the at least one processor is configured to allocate a corresponding memory location for each node to store the corresponding array element and a pointer representing a linkage to a memory address of the memory location of the next node.

8. The device of claim 5, wherein the at least one processor is configured to:
respond to a request to provide a selected multi-dimensional vector for processing by the redemption predictor neural network where the selected multi-dimensional vector is presently stored as a dense representation:
allocate a new set of memory addresses to store the array elements of the selected multi-dimensional vector;
convert the selected multi-dimensional vector from the dense representation and store the selected multi-dimensional vector in the new set of allocated memory addresses.

9. The device of claim 5, wherein the at least one processor is configured to:
periodically monitor social activity levels of the one or more aggregated multi-dimensional vectors of the plurality of aggregated multi-dimensional vectors classified as the less-social multi-dimensional vectors to determine a subset of the less-social multi-dimensional vectors being associated with social activity levels greater than a threshold social activity level;
re-classify the subset of the less-social multi-dimensional vectors to remove the less social classification;
allocate a new set of memory addresses to store the array elements of the re-classified subset of aggregated multi-dimensional vectors; and
convert the each aggregated multi-dimensional vector of the subset of aggregated multi-dimensional vectors from the dense representation to a sparse representation by storing each aggregated multi-dimensional vector of the subset of aggregated multi-dimensional vectors in the new set of allocated memory addresses.

10. The device of claim 2, wherein the variables stored in each array element include at least both raw data values and transformed data values, the transformed data values determined by applying non-linear transformations to the raw data values, the transformed data values reducing a number of training cycles otherwise required by the recommender neural network to recognize non-linear patterns correlating redemption behavior and each array element of the plurality of array elements.

11. A computer-implemented method for maintaining electronic representations of aggregate user behavior stored as a plurality of multi-dimensional vectors, each multi-dimensional vector corresponding to a user of a plurality of users and representing an approximation of the user's behavior in n-dimensional space, the method comprising:
receiving, from one or more point of sale devices, transaction information data sets representing purchase transactions of each user of the plurality of users, the transaction information including, for each purchase transaction, at least a user identifier, an approximate location of purchase, a time-stamp, a retailer, and a price;
receiving, from one or more harvester applications residing on user computing devices each corresponding to a user of the plurality of users, social media data including at least one of text, video, images, and audio data associated with the transaction information;
estimating, from the social media data, one or more types of product associated with each purchase transaction;
generating, for each purchase transaction, a temporary multi-dimensional vector representing the purchase transaction, the temporary multi-dimensional vector storing, in separate dimensions of the vector, numerical values extracted from at least the transaction information and the social media data; and
updating, for each user associated with the purchase transactions, an aggregated multi-dimensional vector generated from a corpus of purchase transactions associated for the user by incorporating the temporary multi-dimensional vector into the aggregated multi-dimensional vector;
wherein the aggregated multi-dimensional vector is adapted for processing by a redemption predictor neural network to identify one or more patterns associated with redemption of one or more electronic offers presented to the plurality of users, the one or more patterns utilized to generate a redemption prediction which is then compared against tracked real-world redemption behavior of the plurality of users to train the redemption predictor neural network;
provision a multi-dimensional vector representative of a reward for redemption, the reward including a pre-defined number of available potential referrals by a selected user;
receive an indication of a request to share the reward with a second user of the plurality of users;
determine one or more vector distances between (i) the aggregated multi-dimensional vector associated with the second user and (ii) at least one of the aggregated multi-dimensional vector associated with the selected user and the multi-dimensional vector representative of the reward for redemption;
responsive to the request, provision the reward for redemption to the second user, and decrement the number of available potential referrals by the selected user by a second pre-defined number, the second pre-defined number determined at least based on the one or more vector distances.

12. The method of claim 11, wherein each aggregated multi-dimensional vector is represented in an array of a plurality of array elements, and each array element of the plurality of array elements represents a different dimension of the aggregated multi-dimensional vector, the array elements, in combination, representing the approximation of the user's behavior in the n-dimensional space.

13. The method of claim 12, wherein each array element of the plurality of array elements is a pointer to a memory location storing a variable representative of a corresponding characteristic of the user.

14. The method of claim 13, further comprising allocating for each aggregated multi-dimensional vector of the plurality of aggregated multi-dimensional vectors, a set of corresponding memory addresses based on the pointer to the memory location of each array element in the array representing the multi-dimensional vector.

15. The method of claim 14, further comprising:
classifying one or more aggregated multi-dimensional vectors of the plurality of aggregated multi-dimensional vectors as less-social multi-dimensional vectors based on a determination that the one or more aggregated multi-dimensional vectors each contain a number of non-zero array elements below a threshold value;

storing the one or more aggregated multi-dimensional vectors classified as less-social multi-dimensional vectors as dense representations; and de-allocating the sets of memory addresses corresponding to the one or more aggregated multi-dimensional vectors classified as less-social multi-dimensional vectors as dense representations.

16. The method of claim 15, wherein the dense representations are stored in the form of linked-lists of nodes, each node representing a corresponding non-zero array element, and linked to a next node representing a next non-zero array element unless the node is an end node.

17. The method of claim 16, further comprising allocating a corresponding memory location for each node to store the corresponding array element and a pointer representing a linkage to a memory address of the memory location of the next node.

18. The method of claim 15, further comprising:
responsive to a request to provide a selected aggregated multi-dimensional vector for processing by the redemption predictor neural network where the selected aggregated multi-dimensional vector is presently stored as a dense representation:
allocating a new set of memory addresses to store the array elements of the selected aggregated multi-dimensional vector; and
converting the selected multi-dimensional vector from the dense representation and store the selected aggregated multi-dimensional vector in the new set of allocated memory addresses.

19. The method of claim 15, further comprising:
periodically monitoring social activity levels of the one or more aggregated multi-dimensional vectors of the plurality of aggregated multi-dimensional vectors classified as the less-social multi-dimensional vectors to determine a subset of the less-social multi-dimensional vectors being associated with social activity levels greater than a threshold social activity level;
re-classifying the subset of the less-social multi-dimensional vectors to remove the less social classification;
allocating a new set of memory addresses to store the array elements of the re-classified subset of multi-dimensional vectors; and
converting the each aggregated multi-dimensional vector of the subset of multi-dimensional vectors from the dense representation to a sparse representation by storing each aggregated multi-dimensional vector of the subset of multi-dimensional vectors in the new set of allocated memory addresses.

20. The method of claim 12, wherein the numerical variables stored in each array element include at least both raw data values and transformed data values, the transformed data values determined by applying non-linear transformations to the raw data values, the transformed data values reducing a number of training cycles otherwise required by the recommender neural network to recognize non-linear patterns correlating redemption behavior and each array element of the plurality of array elements.

21. A non-transitory computer readable media storing a set of computer-interpretable instructions, the set of instructions which, when executed on a processor, cause the processor to perform a computer-implemented method for maintaining electronic representations of aggregate user behavior stored as a plurality of multi-dimensional vectors, each multi-dimensional vector corresponding to a user of a plurality of users and representing an approximation of the user's behavior in n-dimensional space, the method comprising:

receiving, from one or more point of sale devices, transaction information data sets representing purchase transactions of each user of the plurality of users, the transaction information including, for each purchase transaction, at least a user identifier, an approximate location of purchase, a time-stamp, a retailer, and a price;

receiving, from one or more harvester applications residing on user computing devices each corresponding to a user of the plurality of users, social media data including at least one of text, video, images, and audio data associated with the transaction information;

estimating, from the social media data, one or more types of product associated with each purchase transaction;

generating, for each purchase transaction, a temporary multi-dimensional vector representing the purchase transaction, the temporary multi-dimensional vector storing, in separate dimensions of the vector, numerical values extracted from at least the transaction information and the social media data; and updating, for each user associated with the purchase transactions, an aggregated multi-dimensional vector generated from a corpus of purchase transactions associated for the user by incorporating the temporary multi-dimensional vector into the aggregated multi-dimensional vector;

wherein the aggregated multi-dimensional vector is adapted for processing by a redemption predictor neural network to identify one or more patterns associated with redemption of one or more electronic offers presented to the plurality of users, the one or more patterns utilized to generate a redemption prediction which is then compared against tracked real-world redemption behavior of the plurality of users to train the redemption predictor neural network;

provision a multi-dimensional vector representative of a reward for redemption, the reward including a pre-defined number of available potential referrals by a selected user;

receive an indication of a request to share the reward with a second user of the plurality of users;

determine one or more vector distances between (i) the aggregated multi-dimensional vector associated with the second user and (ii) at least one of the aggregated multi-dimensional vector associated with the selected user and the multi-dimensional vector representative of the reward for redemption;

responsive to the request, provision the reward for redemption to the second user, and decrement the number of available potential referrals by the selected user by a second pre-defined number, the second pre-defined number determined at least based on the one or more vector distances.

22. The device of claim 1, wherein cohort information transferred from one or more computer servers is displayed on a client device based on one or more dimensions of a selected aggregated multi-dimensional vector representing one or more social interactions including at least one a data set representative of a selection of an interactive visual interface element on a digital representation of a digital story rendering spending data of one or more users in one or more several categories and one or more spending modes.

23. The device of claim 22, wherein the one or more spending modes includes at least one or more cryptocurrency transactions.

24. The device of claim 4, wherein the at least one processor is configured to:
classify one or more aggregated multi-dimensional vectors of the plurality of aggregated multi-dimensional vectors as less-social multi-dimensional vectors based on a prioritized ranking of the plurality of aggregated multi-dimensional vectors based at least on a power law distribution used to separately determine at least an in-degree and an out-degree for each aggregated multi-dimensional vector of the plurality of aggregated multi-dimensional vectors.

* * * * *